United States Patent
Stemmle

(10) Patent No.: US 8,369,985 B2
(45) Date of Patent: Feb. 5, 2013

(54) MAIL SORTER FOR SIMULTANEOUS SORTING USING MULTIPLE ALGORITHMS

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 898 days.

(21) Appl. No.: 12/518,385

(22) PCT Filed: Apr. 7, 2006

(86) PCT No.: PCT/US2006/012861
§ 371 (c)(1),
(2), (4) Date: Jun. 9, 2009

(87) PCT Pub. No.: WO2006/110465
PCT Pub. Date: Oct. 19, 2006

(65) Prior Publication Data
US 2010/0049360 A1 Feb. 25, 2010

Related U.S. Application Data

(60) Provisional application No. 60/669,340, filed on Apr. 7, 2005.

(51) Int. Cl.
*G06K 9/00* (2006.01)
*B07C 5/02* (2006.01)
*B07C 5/00* (2006.01)
*G06F 7/00* (2006.01)
*B65H 5/16* (2006.01)

(52) U.S. Cl. ........ 700/223; 700/224; 209/583; 209/584; 209/600; 209/539; 271/303

(58) Field of Classification Search .......................... None
See application file for complete search history.

(56) References Cited

U.S. PATENT DOCUMENTS

| 1,482,311 A | * | 1/1924 | Long et al. ............. 414/271 |
| 3,420,368 A | | 1/1969 | Sorrells |
| 3,452,509 A | | 7/1969 | Hauer |

(Continued)

FOREIGN PATENT DOCUMENTS

| GB | 2047189 A | 11/1980 |
| JP | 1159088 | 6/1989 |

(Continued)

OTHER PUBLICATIONS

Office Action dated Jan. 18, 2011 in U.S. Appl. No. 11/856,174.

(Continued)

*Primary Examiner* — Gene Crawford
*Assistant Examiner* — Yolanda Jones
(74) *Attorney, Agent, or Firm* — Marcus P. Efthimiou; Andrew M. Calderon; Roberts Mlotkowski Safran & Cole, P.C.

(57) ABSTRACT

A mail sorter, method, and software product are used for sorting inbound mail pieces and outbound mail pieces. The mail sorter includes sorter modules cooperatively engaged with each other, so as to receive mail pieces that are a mixture of both inbound mail pieces and outbound mail pieces, and so as to sort both the inbound mail pieces and the outbound mail pieces. The mail sorter also includes an unsorted mail piece path that is utilized by both the inbound mail pieces and the outbound mail pieces. The outbound mail pieces are mail pieces destined for sorting at a remote postal facility prior to delivery to destination addresses, whereas the inbound mail pieces are mail pieces that are not destined for sorting at a remote postal facility prior to delivery to destination addresses.

28 Claims, 16 Drawing Sheets

U.S. PATENT DOCUMENTS

| | | | |
|---|---|---|---|
| 3,573,748 | A | 4/1971 | Holme |
| 3,587,856 | A | 6/1971 | Lemelson |
| 3,757,939 | A | 9/1973 | Henig |
| 3,889,811 | A | 6/1975 | Yoshimura |
| 3,901,797 | A | 8/1975 | Storace |
| 3,904,516 | A | 9/1975 | Chiba |
| 3,933,094 | A | 1/1976 | Murphy |
| 4,008,813 | A | 2/1977 | Leersnijder |
| 4,058,217 | A | 11/1977 | Vaughan |
| 4,106,636 | A | 8/1978 | Ouimet |
| 4,169,529 | A | 10/1979 | Hunter |
| 4,244,672 | A | 1/1981 | Lund |
| 4,507,739 | A | 3/1985 | Haruki |
| 4,627,540 | A | 12/1986 | Takeda |
| 4,688,678 | A | 8/1987 | Zue |
| 4,738,368 | A | 4/1988 | Shaw |
| 4,863,037 | A * | 9/1989 | Stevens et al. ............... 53/381.3 |
| 4,868,570 | A | 9/1989 | Davis |
| 4,874,281 | A | 10/1989 | Bergerioux |
| 4,891,088 | A | 1/1990 | Svyatsky |
| 4,895,242 | A | 1/1990 | Michel |
| 4,921,107 | A | 5/1990 | Hofer |
| 4,923,022 | A | 5/1990 | Hsieh |
| 4,965,829 | A | 10/1990 | Lemelson |
| 5,031,223 | A | 7/1991 | Rosenbaum |
| 5,042,667 | A | 8/1991 | Keough |
| 5,072,401 | A * | 12/1991 | Sansone et al. ............... 700/219 |
| 5,113,349 | A | 5/1992 | Nakamura et al. |
| 5,119,954 | A | 6/1992 | Svyatsky |
| 5,186,336 | A | 2/1993 | Pippin |
| 5,291,002 | A | 3/1994 | Agnew |
| 5,470,427 | A | 11/1995 | Mikel |
| 5,480,032 | A | 1/1996 | Pippin |
| 5,518,122 | A * | 5/1996 | Tilles et al. ................... 209/539 |
| 5,718,321 | A | 2/1998 | Brugger |
| 5,981,891 | A | 11/1999 | Yamashita |
| 6,011,998 | A | 1/2000 | Lichti et al. |
| 6,107,588 | A | 8/2000 | De Leo et al. |
| 6,126,017 | A | 10/2000 | Hours |
| 6,227,378 | B1 | 5/2001 | Jones |
| 6,276,509 | B1 | 8/2001 | Schuster |
| 6,328,302 | B2 | 12/2001 | Hendrickson et al. |
| 6,347,710 | B1 | 2/2002 | Ryan |
| 6,365,862 | B1 | 4/2002 | Miller |
| 6,377,867 | B1 | 4/2002 | Bradley et al. |
| 6,403,906 | B1 | 6/2002 | De Leo |
| 6,435,353 | B2 | 8/2002 | Ryan |
| 6,443,311 | B2 | 9/2002 | Hendrickson |
| 6,555,776 | B2 | 4/2003 | Roth |
| 6,561,339 | B1 | 5/2003 | Olson |
| 6,561,360 | B1 | 5/2003 | Kalm |
| 6,674,038 | B1 | 1/2004 | Latta |
| 6,677,548 | B2 | 1/2004 | Robu |
| 6,697,703 | B2 | 2/2004 | Lopez |
| 6,814,210 | B1 | 11/2004 | Hendzel |
| 6,897,395 | B2 | 5/2005 | Shiibashi |
| 6,924,451 | B2 | 8/2005 | Hanson |
| 6,946,612 | B2 | 9/2005 | Morikawa |
| 6,953,906 | B2 | 10/2005 | Burns |
| 6,978,192 | B2 | 12/2005 | Wisniewski |
| 6,994,220 | B2 | 2/2006 | Schererz |
| 7,004,396 | B1 | 2/2006 | Quine |
| 7,012,211 | B2 | 3/2006 | Brinkley et al. |
| 7,060,926 | B2 * | 6/2006 | Edmonds ....................... 209/584 |
| 7,111,742 | B1 | 9/2006 | Zimmermann |
| 7,112,031 | B2 | 9/2006 | Harres |
| 7,112,756 | B2 | 9/2006 | Hanson |
| 7,138,596 | B2 | 11/2006 | Pippin et al. |
| 7,165,377 | B2 | 1/2007 | Gillet |
| 7,170,024 | B2 | 1/2007 | Burns |
| 7,210,893 | B1 | 5/2007 | Overman |
| 7,227,094 | B2 | 6/2007 | Oexle |
| 7,235,756 | B2 | 6/2007 | De Leo |
| 7,250,582 | B2 | 7/2007 | Hanson |
| 7,259,346 | B2 | 8/2007 | Svyatsky |
| 7,304,260 | B2 | 12/2007 | Boller |
| 7,378,610 | B2 | 5/2008 | Umezawa |
| 7,396,011 | B2 | 7/2008 | Svyatsky et al. |
| 7,397,010 | B2 | 7/2008 | Wilke |
| 7,397,011 | B2 | 7/2008 | Berdelle-Hilge |
| 7,464,822 | B2 | 12/2008 | Coffelt et al. |
| 2002/0053533 | A1 | 5/2002 | Brehm |
| 2002/0103573 | A1 | 8/2002 | Fellows et al. |
| 2002/0113365 | A1 * | 8/2002 | Britton et al. ................. 271/303 |
| 2003/0006174 | A1 | 1/2003 | Harres |
| 2003/0038065 | A1 | 2/2003 | Pippin et al. |
| 2004/0153379 | A1 | 8/2004 | Joyce et al. |
| 2004/0178126 | A1 | 9/2004 | Shah |
| 2004/0211710 | A1 | 10/2004 | Hanson et al. |
| 2005/0043850 | A1 | 2/2005 | Stevens et al. |
| 2005/0247606 | A1 | 11/2005 | Redford |
| 2006/0020366 | A1 | 1/2006 | Bloom |
| 2006/0070929 | A1 | 4/2006 | Fry |
| 2006/0088405 | A1 | 4/2006 | Leimbach et al. |
| 2006/0124512 | A1 | 6/2006 | Quine |
| 2006/0124738 | A1 | 6/2006 | Wang et al. |
| 2006/0144763 | A1 | 7/2006 | Coffelt et al. |
| 2006/0180520 | A1 | 8/2006 | Ehrat |
| 2006/0191822 | A1 | 8/2006 | Avant |
| 2007/0075000 | A1 | 4/2007 | Martens et al. |
| 2007/0090029 | A1 | 4/2007 | Avant |
| 2007/0131593 | A1 | 6/2007 | Burns |
| 2007/0209976 | A1 | 9/2007 | Worth et al. |
| 2007/0272601 | A1 | 11/2007 | Cormack |
| 2008/0011653 | A1 | 1/2008 | Stemmle |
| 2008/0012211 | A1 | 1/2008 | Stemmle |
| 2008/0027986 | A1 | 1/2008 | Stemmle |
| 2008/0093273 | A1 | 4/2008 | Stemmle |
| 2008/0093274 | A1 | 4/2008 | Stemmle |
| 2008/0164185 | A1 | 7/2008 | Stemmle |

FOREIGN PATENT DOCUMENTS

| | | |
|---|---|---|
| JP | 1271789 | 10/1989 |
| WO | 02/00362 | 1/2002 |
| WO | WO-03011484 A1 | 2/2003 |
| WO | 03/043750 | 5/2003 |

OTHER PUBLICATIONS

Office Action dated Aug. 9, 2010 in U.S. Appl. No. 11/856,174.
Office Action dated Feb. 24, 2010 in U.S. Appl. No. 11/856,174.
"Development of in-process skew and shift adjusting mechanism for paper handling," American Society of Mechanical Engineers http://www.directtextbook.com, 1998.
"MPS 40," http://web.archive.org/web/20031207022427 (OPEX), p. 1, Dec. 7, 2003.
PCT International Search Report issued in PCT/US06/12861, Sep. 18, 2007.
U.S. Appl. No. 11/885, 231, U.S. family member of International Application No. PCT/US2005/044560.
U.S. Appl. No. 11/885,230, U.S. family member of International Application No. PCT/US2005/044406.
U.S. Appl. No. 11/856,174, U.S. family member of International Application No. PCT/2006/012892.
U.S. Appl. No. 11/632,922, U.S. family member of International Application No. PCT/US2005/025899.
U.S. Appl. No. 11/632,923, U.S. family member of International Application No. PCT/US2005/025846.
International Application No. PCT/US2005/044413.
International Application No. PCT/US2005/025634.
International Search Report WO 2006/110465 A3 dated Jan. 9, 2007.
Notice of Allowance dated Jun. 29, 2011 for corresponding U.S. Appl. No. 11/856,174.
Supplementary European Search Report for Application No. EP 06749427 dated Sep. 22, 2011.
Supplementary European Search Report for Application No. 06749440.1 dated Nov. 16, 2011.
Office Action for U.S. Appl. No. 12/518,543 dated Mar. 19, 2012.
Office Action for U.S. Appl. No. 12/518,543 dated Oct. 12, 2012.

* cited by examiner

MAIL SORTER FOR SIMULTANEOUS SORTING USING MULTIPLE ALGORITHMS

CROSS-REFERENCE TO RELATED APPLICATION

The present application claims priority to U.S. Provisional Application No. 60/669,340 filed 7 Apr. 2005.

TECHNICAL FIELD

The present invention relates generally to sorting of mail, and more particularly to improved mail sorting efficiencies.

BACKGROUND OF THE INVENTION

Many posts around the world are seeking to develop a more effective mail merging system that automatically merges all mail streams and sorts them to as fine a degree as time permits, preferably to delivery sequence. The system should accomplish this merging at the step of carrier sequence sorting by merging all elements of the mail stream (letters, flats, periodicals, post cards etc.) at some point during the sorting process.

At present, some of the mail streams arrive at the postal branch offices sorted in delivery sequence and some do not. Generally, even when the mail arrives at the branch already sorted to delivery sequence, postal carriers need to merge multiple streams of mail (often as many as ten streams) from different mail trays—and for this, the postal carriers generally use a manual sorting process. When mail does not arrive at the branch already sorted, the carriers spend even more time—several hours—sorting the mail into carrier delivery sequence manually. Often, the carrier on mechanized routes will complete the mail merging while sitting at each post box—merging mail from multiple mail trays on the spot before placing it in the mailbox. This requires carriers to spend substantial time merging and sorting the mail before they can start to deliver it, or else they must complete the merging while they are delivering the mail, thus making the mail delivery process (the last mile) quite inefficient.

In 1990, the United States Postal Service (USPS) issued a Request for Proposal for a carrier sequence bar code sorter, type B, a single pass sorter to arrange mail in carrier delivery sequence. To date, 16 years later, no product has yet been manufactured and delivered to satisfy that need.

The 2003 Presidential Commission Report on the Future of the United States Postal Service (USPS) concluded that the Postal Service should continue to develop an effective merging system that is responsive to customer needs and culminates in one bundle of mixed letters and flats for each delivery point. The system should accomplish this merging at the step of carrier sequence sorting by merging all elements of the mail stream (letters, flats, periodicals, post cards etc) at the final sorting process.

The USPS sometimes does delivery sequence sorting at central sorting facilities. The sorting is done there because the equipment required to automate this process is simply too large to fit in the branches. The cost would be prohibitive for the USPS to install such equipment in each branch. Furthermore, sorting centrally is also much more efficient, since the only sorters available today are multiple pass sorters which may include over a hundred bins and may require two or more sort sequences to get the mail in delivery sequence order. However, when the carrier delivery sequence sorting is done centrally, and then sent to branch offices, the carriers usually spend the first two to three hours of their day merging sorted mail with other unsorted mail, much of which was shipped directly to the branch offices by publishers to receive discounts on postage, and sorting it all to delivery sequence. For many places in the postal network (especially outside the USA), mail is still sorted by the carriers manually, placing each piece in a slot with a designated address to sort the mail into delivery sequence.

The sorters available on the market today have significant limitations: they are either huge, expensive pieces of equipment with a very large number of bins, and require significant space to operate; or they have a smaller number of bins, but require multiple passes to operate. This multi-pass operation is a very labor-intensive process. So, for example, a sorter with 16 bins, sorting a job with 2000 mail pieces, will require three passes to sort to delivery sequence for 600 address on a route. That means the operator must load the mail, operate the sorter, then unload the mail from each bin and re-load it into the feeder three times. While this results in some time savings compared to manual sorting, the value proposition is limited because of the high labor content. See, for example, U.S. Pat. No. 6,555,776 entitled "Single Feed One Pass Mixed Mail Sequencer," filed 2 Apr. 2001 and issued 29 Apr. 2003.

It is because of the high labor content still required with high speed, multi-pass sorting equipment that postal services such as the USPS, Swiss Post, and Royal Mail have requested proposals for a single pass system that can merge all mail together before it is sorted to delivery sequence. Likewise, the manual method is still the most common method that enterprises use to sort their incoming mail; this is also very labor intensive, but the investment required and the size of available mail sortation equipment is generally prohibitive.

The following two U.S. provisional patent applications are incorporated herein in their entirety: Application No. 60/589,634 (filed 21 Jul. 2004), and Application No. 60/634,014 (filed 7 Dec. 2004). The first of those two provisional applications (Ser. No. 60/589,634) provided a basis for U.S. Regular Patent Application Serial No. 2005025846 filed 21 Jul. 2005; and U.S. Regular Patent Application Serial No. 2005025899 filed 21 Jul. 2005; and also U.S. Regular Patent Application Serial No. 2005025634 filed 21 Jul. 2005. The second of those two provisional applications (Ser. No. 60/634,014) provided a basis for U.S. Regular Patent Application Serial No. 2005044560 filed 7 Dec. 2005; and U.S. Regular Patent Application Serial No. 2005044406 filed 7 Dec. 2005; and also U.S. Regular Patent Application Serial No. 2005044413 filed 7 Dec. 2005. Those two previously filed U.S. provisional patent applications describe various aspects of a full escort sorting system. Using such full escort sorting systems provides benefits such as the following:

1. All mail can be sorted to delivery sequence in a single pass, a pass being defined as one cycle of operator loading into the sorter.
2. The full range of mail can be handled including cards, letters, flats, periodicals, publications, newspapers, and parcels up to 25 mm thick.
3. The sorter operates at very slow speeds (0.05 m/sec compared to the 5.0 m/sec for competitive sorting speeds)—but can complete equivalent jobs in less time than competitive sorters.
4. Each mail piece is touched only once. After it is fed and read, each mail piece is put in a clamp, and the sorter interacts only with the clamp throughout the entire sorting operations. (Note that the present invention is, of course, not limited to clamp-based sorting systems, and can work with conventional sorters as well.)

5. Automated unloading algorithms eliminate the need for an operator to "sweep" the sorter (sweeping refers to manually unloading the sorter).
6. The sorting stations can be modular—so that the sorter can be configured as large or as small as needed, and can be adapted to the customer's existing facility. The sorter uses vertical space to reduce footprint.
7. The sorter can be operated with one or two operators in a centralized application, compared to five to eight operators for competitive equipment.

It is noted that the clamp arrangement just mentioned (at item 4) is similar in a limited sense to an invention of Catherwood, disclosed by International Application PCT/GB02/05203 with International Filing Date on 19 Nov. 2002. In Catherwood, however, it is required to attach self-adhesive tape to mail pieces, unlike in the two previously filed U.S. provisional patent applications.

Centralized sorting centers such as the USPS facility at Wallingford, Conn., USA, process inbound mail during one or more shifts and outbound mail during other shifts within a 24-hour period. Inbound mail is mail collected locally plus mail sent from other sorting centers intended for sorting and delivery within the area served by the centralized sorting center. Outbound mail is mail collected locally, destined for other sorting centers.

The Wallingford sorting center operates around the clock in three shifts, and handles mail volumes of 5.5 million letters and about half a million flats every 24 hours. Separate pieces of sorting equipment are required for letters and flats, and at least 20% of the mail cannot be sorted by machine and must be sorted by hand.

To accomplish this level of volume, Wallingford currently has 25 pieces of sorting equipment, operated by 72 operators each shift. The specific equipment is as follows:

18 Delivery Bar Code Sorters (DBCS) with 206 bins for delivery sequence sorting of letters, 40,000/hour, 2 operators 3 Bar Code Sorters (BCS)—only reads bar code, 100 stackers, 2 operators 3 FS100 for flats, requires 5 operators, 15,000-18,000 flats per hour, 3 feeders 1 FS1000 for non-machinable flats: 5 operators Newspapers sorted manually, probably 8-10 clerks Throughout this application, a "bin" refers to a sorted mail station, and a "feeder" refers to a feeding station.

In addition, some areas of Wallingford are equipped with a tray handling, storage, and retrieval system to move trays of mail from point to point. However, much of the tray storage and transporting is still done manually by postal employees pushing trolleys full of mail trays by hand.

Impressive as the Wallingford sorting operation is, there are several weaknesses in the current system, such as the following:

1. Dozens of employees are required to simply move mail onto and off of trolleys, and move the trolleys from one point to another point in the facility multiple times.
2. Each mail piece must be loaded onto a feeder belt so it can be fed into a sorter, and then unloaded from the sorter multiple times during the sorting process.
3. Each trip through the sorter involves risks that the mail will jam, or be damaged by the automated processing equipment. Typical operating speeds for the mail in a sorter are over 200 in/sec (5 meters/sec), which is so fast that the mail appears as a blur. It is not uncommon for any single mail piece to go through one or more mail sorters 4 to 6 times. Each of these trips through the sorter increases the risk of jams or damage.
4. Despite the large investments in automation, a relatively high proportion of the mail is still considered "non-machinable." Currently, about 20% of the letter mail cannot be sorted automatically. An equivalent percentage of flats will probably be considered non-machinable once the next generation of flats sorting equipment is installed. This mail is still manually sorted to route and then manually sorted again—to delivery sequence—at the DDUs (Destination Delivery Units, or local post offices where the mail carriers report to work). These manually sorting steps are a time consuming and costly process. Despite the high investments in automation, each mail carrier still spends between 2.5 and 3 hours each day manually sorting the mail that could not be sorted by machine. This step alone costs the USPS about $3 Billion each year in labor costs.
5. There are a number of operations that are still done manually at Wallingford because the mail cannot be handled by the automated equipment. Newspapers, periodicals, flyers, and some magazines fall into this category. Again, the manual operations are the most costly in the sorting operations.
6. The sorting equipment has limited capacity and a finite number of pockets—which is the reason mail must be run through the sorters multiple times. Typically, the sorters are operated in different modes at different times of the day. So, during one shift, only outbound mail may be sorted. Any mail for the area served by Wallingford is identified during the sorting process, and set aside for sorting further during a later shift. A second shift might then be used to sort the inbound mail to zone. The mail is sorted again—to route. Mixed in with these sorting processes is the "local" mail that was set aside during the first shift sorting. Then, the third shift might re-sort all of the mail sorted during the second shift—this time sorting to delivery sequence. The sorters must be set up to operate with these different sorting algorithms—and the sorted mail must be unloaded, stored, then later made available for re-loading into the sorter for subsequent sorts. This not only requires a lot of labor, it also requires a lot of floor space for storing the mail.
7. The 25 pieces of sorting equipment and the space around them to store trays of mail for processing multiple times all requires a huge footprint. The attached sketch approximates the floor space required for the 25 pieces of sorting equipment at nearly 70,000 square feet of floor space. The cost of real-estate, heating, maintenance, etc. must also be considered in the cost of processing the mail. If this space could be reduced, the cost per mail piece for sorting will similarly be reduced.
8. The sorting equipment tends to be dedicated to a single type of mail piece. Separate systems are required for sorting different types of mail: some sorters sort only letters and others sort only flats. If a greater than normal volume of one type of mail occurs on any particular day, there is no opportunity to divert some of that mail processing to a sorter designed to handle only the other type of mail. So, the managers have limited flexibility in how they use the equipment.

So, while the automated sorting operations at Wallingford are quite impressive in the degree of efficiency and sophistication, there remain numerous opportunities for improving the efficiency of the operations even further. Wallingford is used only by example. All of the 387 Wallingford-like sorting centers within the USPS network, and the thousands of Wallingford-like sorting centers in other postal systems around the world, would greatly benefit from increased efficiencies.

SUMMARY OF THE INVENTION

A mail sorter, method, and software product are used in order to sort inbound mail pieces as well as outbound mail pieces. The mail sorter includes sorter modules in cooperative engagement with each other. The mail sorter also includes an unsorted mail piece path that is utilized by both the inbound mail pieces and the outbound mail pieces. The outbound mail pieces are mail pieces destined for sorting at a remote postal facility prior to delivery to destination addresses, whereas the inbound mail pieces are mail pieces that are not destined for sorting at a remote postal facility prior to delivery to destination addresses.

A controller can be configured for sorting inbound mail pieces while simultaneously sorting at least part of the outbound mail pieces. The sorter modules may include a sort-to-route module for sorting inbound mail pieces according to delivery route, and a sort-to-tray module for sorting outbound mail pieces according to outbound destination. If so, the sort-to-tray module can include diverters for diverting mail pieces to a storage area, and from the storage area. Such a sort-to-tray module has a sorted mail piece path and an unsorted mail piece path, and the storage area is located between the sorted mail piece path and the unsorted mail piece path. The diverters can divert the mail pieces from the unsorted mail piece path to the storage area, and from the storage area to the sorted mail piece path.

The mail sorter may additionally include a sort-to-delivery-sequence module for sorting the inbound mail pieces according to delivery location along the delivery route. The sorted mail piece path of the sort-to-route module may advantageously be connected to the unsorted mail piece path of the sort-to-delivery sequence module.

DESCRIPTION OF THE DRAWINGS

The accompanying drawings illustrate presently various embodiments of the invention, and assist in explaining the principles of the invention.

DETAILED DESCRIPTION OF AN EMBODIMENT OF THE INVENTION

Figure 1:
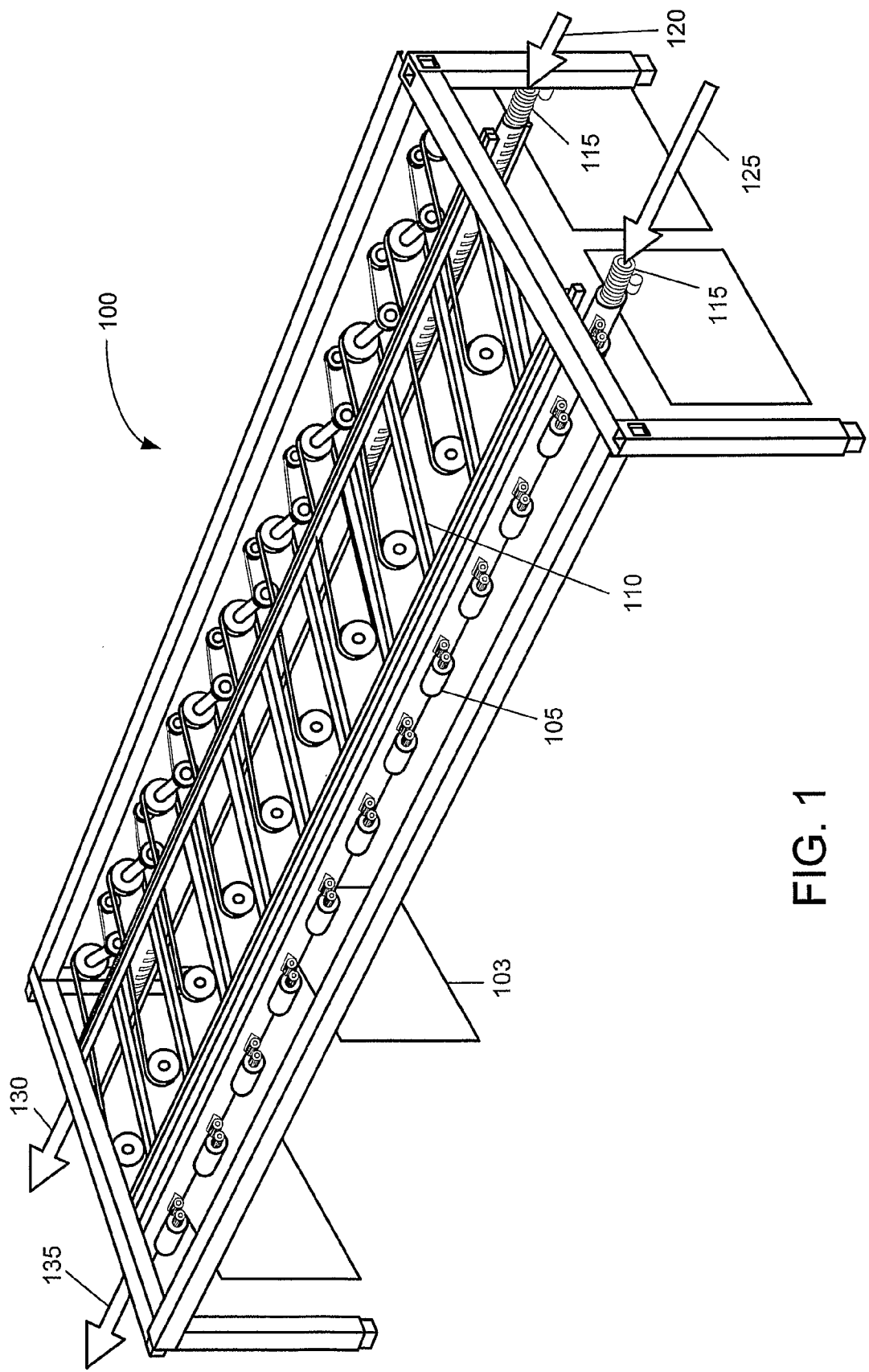
FIG. 1 is a schematic of a sort to delivery sequence module in accordance with an embodiment of the instant invention.

An embodiment of the present invention will now be described, and it is to be understood that this description is for purposes of illustration only, and is not meant to limit the scope of the claimed invention. According to an embodiment of a mail sorting system, each mail piece is singulated, then captured by a clamp. From that point on, all mechanical operations act on the clamp, and the mail piece is not touched by either the operator or the sorter equipment. Because all the clamps are substantially identical in shape and composition, they can be manipulated by the machinery with a high degree of reliability. The present system is capable of handling the entire diversity of the shapes, sizes and weights of mail stream with a consistent reliability, and thus can also handle a wide variety of products that are needed to fulfill and order.

The present system automatically handles letters, flats, postcards, periodicals, odd shaped mail pieces, and even parcels up to a specified, maximum thickness, simultaneously, and intermixed in any order or combination. This capability significantly enhances efficiency.

Also, the present system touches/handles each mail piece only once to singulate and load it into a clamp. After that, there is no more mail handling—only clamp handling. Thus, even with the full gamut of mail piece types, sizes, weights, conditions, and the like, the system will be very reliable (few jams).

Moreover, the present system is capable of sorting all mail into carrier delivery sequence after mail is loaded into the sorter only a single time. There is no need for manual unloading and reloading the sorter for multiple pass operations. Thus, the present system completes the job quickly, and requires far less labor than most conventional sorters.

Additionally, the present system eliminates the need to handle the non-readable mail separately. All mail is handled in exactly the same way. Every mail piece is fed, read, clamped, and moved into the sorter system whether the address is readable or not. Video encoded data is appended to the mail piece location electronically. There is no need to spray on additional information, which saves the cost of the printing subsystem. And there is no need to store the mail during the video encoding step. So, the present sorter is much more compact and less expensive because these subsystems (printing and temporary storage transports) are not required.

Additionally, in this embodiment, the present sorter is modular, so it can be configured to any size, capacity, or shape, to fit existing facilities without modification. A relatively small version of this sorter can fit in each DDU and complete the final sort for each route just before the sorted mail is loaded onto the trucks—so that all the mail that arrives at the DDU can be included in the one and only sort operation. This makes the carriers very efficient by eliminating about 2.5 hours or mail sorting each day, and further eliminates time at each address merging multiple streams of mail manually.

Not only is the present machine more reliable because it handles clamps rather than mail in a single pass, but it is also more reliable because it operates at slow speeds while maintaining very high sorting throughput rates. This maximizes system up-time with jam-free operation, and substantially fewer maintenance operations.

The system can process mail from three or more different routes simultaneously: one in the feeding operation, a second route in the sorting operation, and a third route in the unload and traying operation. This significantly reduces job time per route. Only during the steps of singulating the mail and transporting it to the clamping operation are the mail pieces not escorted.

For all transporting, sorting, and unloading operations, the system handles and manipulates the clamp, not the mail. After unloading, clamps are retained in the system and re-circulated. The present system is fully modular, so that any capacity or footprint can be easily configured without customizing the design of the component modules.

One such improvement is loading each mail piece into a clamp, and handling the clamps rather than the mail pieces. Another improvement is recycling empty clamps back to the feeder. Additionally, the present invention employs a single pass system that sorts to carrier sequence by moving unsorted mail on a first transport, and moving sorted mail to a second transport in a specific sequence, using clamps and clamp driving means to convey the mail. Further improvements included in the present invention are: feeding the clamped mail pieces into a queue before starting the sorting step, and also performing three separate operations (feeding, sorting, and unloading) simultaneously with three separate batches of mail associated with three separate routes. The present system handles non-machine readable mail in exactly the same fashion as machine readable mail. (Also, eliminates the need to print additional information on non-readable mail.) Other innovations of the present invention include a clamp management system in which the clamps are oriented upside down for loading, right side up for sorting, then upside down again for unloading; a clamp management system in which the clamps can be moved from one drive system to at least one additional drive system (for sorting); and a clamp management system in which clamps can be initially spaced at a distance from one another, and then subsequently the distance removed so that the clamps abut one another. Also included in an embodiment of the present invention is a sorting system in which the mail pieces are handled in an orientation in which the faces of the mail pieces are perpendicular to the direction of motion throughout all sorting operations in order to reduce the system footprint and operate at slow speeds without reducing the sorting throughput rate.

According to the sorting system of an embodiment of the present invention, the system accepts a group of mail pieces at one or more loading stations, sorts the group of mail pieces into a desired sequence according to delivery information on the mail pieces, and then moves the mail pieces to at least one unloading station. Although other embodiments of the invention utilize conventional sorters without clamps, in this embodiment the system includes a reader for retrieving delivery information associated with each mail piece, and also includes clamps dimensioned for receipt of a mail piece into each clamp. The system has means for placing each mail piece into one of the clamps, and means for creating an association between the retrieved delivery information of each mail piece and its respective clamp. The system also has a sorter for moving the clamps which hold the mail pieces, based upon the association of each clamp with the retrieved delivery information, so that the mail pieces held by the clamps are sorted according to the desired sequence. Additionally, the system includes means for opening the sorted clamps to release the mail pieces at the unloading station.

I. Integrated Escort Sorter Embodiment For Centralized Sorting Applications—Dual Operating Algorithms In addition to the previously disclosed benefits of a full escort sorting system, this embodiment of the instant invention provides additional operations and configurations that further increase the efficiency and reliability of the proposed sorting system. For example:

1. Provides multiple types of sorting modules on a sorting system to enable simultaneous sorting of both outbound and inbound mail.
2. Operates simultaneously with two separate sorting algorithms: Inbound mail is sorted in a batch mode algorithm. Once loaded into the sorter, it is first sorted to route, and retained in the sorter until a sort to delivery sequence is required. Outbound mail is sorted to destination using a conventional "thru-sort" algorithm, i.e., mail is automatically unloaded as soon as one trayful is accumulated.
3. There is no need to complete a preliminary sort to separate inbound and outbound mail. All mail that enters the facility is entered into the sorter. The sorter recognizes each mail piece as inbound or outbound, and sorts it with the appropriate one of the two algorithms mentioned above.
4. Manual operations such as sorting newspapers, and automatically sorting what is currently considered "non-machinable mail" can now be sorted automatically when such mail pieces are manually fed past a reader, then automatically clamped and sorted along with all the other "machinable" mail.
5. There is no need to cull out non-machinable mail, or to separate collection mail into letters and flats. All types of mail can be loaded directly into the sorter completely intermixed, once it is received at the facility.

This invention greatly increases efficiency, dramatically lowers the risks of jams and damage to the mail pieces during processing (by handling each mail piece only once, at very slow speeds), reduces the labor required for sorting by about 80%, reduces the number of pieces of sorting equipment required by 60%, and reduces the floor space required by about 80%, all while processing the same amount of mail in the same amount of time. It further provides management flexibility by replacing equipment that can handle only a single type of mail (letters or flats) with equipment that can handle all types of mail—even those types of mail that have to be sorted manually with the current systems. Within a centralized sorting facility, the need for automated (or manual) tray handling equipment is eliminated. Trays are required only for bringing mail into the facility and taking it out of the facility, but not within the sorting operations inside the facility. So, all the equipment currently required for transporting, storing, and retrieving mail trays can be eliminated, along with the floor space required for such equipment.

The aforementioned provisional patent applications described various aspects of a sorting concept that escorts the mail throughout the sorting system so that the mail can be sorted after being touched only once throughout the sorting process. Each mail piece is clamped in a clamp, and all of the sorting mechanisms operate on the clamp, and not on the mail piece itself. This enables the sorting system to handle the entire spectrum of mail piece types simultaneously. Much of the thinking for these disclosures was for a device to be placed in the DDUs, to be operated for the final step of sorting one route's worth of mail to delivery sequence. Many posts, such as the Royal Mail and Deutsche Post, are interested in automating the centralized sorting facilities. Thus, this embodiment of the instant invention focuses on scaling up the sorting concepts disclosed in the aforementioned provisional patent applications to operate with much higher volumes in centralized facilities.

Disclosed herein is a method and system for simultaneously sorting inbound and outbound mail in a centralized sorting center. All mail coming into a centralized sorting facility is loaded into the sorter. The sorter identifies each piece as either inbound or outbound. Inbound mail is sorted using a batch mode algorithm in which each mail piece is first sorted to route and retained within the sorter. Just before the mail is to be sent to the local post offices for delivery, this inbound mail is recycled without leaving the sorter for a second pass to sort it to delivery sequence and unload it into trays. Outbound mail is sorted using a pass-thru algorithm in which the sorter sorts mail for a number of delivery destinations, and retains the mail only until a tray full of mail for a common destination is collected. When a tray full is collected for a common destination, this mail is sent to an unloading and traying subsystem, which automatically puts the mail into a tray marked for the correct destination. For both inbound and outbound mail, the mail is fed into the sorter only once. Unloading is completely automated, thereby saving substantial labor.

Sorting systems to accomplish simultaneous inbound and outbound sorting are assembled using three types of sorting modules:

1. Type 1 having many address stations each with small capacity for final sorting to delivery sequence. Type 1 modules can also be used in the same way as Type 2 modules by ganging together multiple address stations to form a single address station with much larger capacity during the first sorting pass. Then it can be used for finer sorting operations using all or most of the smaller capacity address stations during a second pass.
2. Types 2A & 2B, with a single address station capable of storing large capacity of clamped mail pieces. These will be re-circulated through the sorter for a finer sort at a later time.
3. Type 3, having three paths for advancing unsorted mail, storing capacity sufficient to fill one tray of sorted mail, and a third path for bypassing downstream sorting stations to advance the sorted mail to an unloading and traying station.

These three types of sorting modules are assembled into a sorting system along with other subsystems such as feeders, turn modules, traying subsystems, controller, and the like. A typical assembly for a large sorting system is shown in the Figures.

This large sorter assembly is operated using two sorting algorithms simultaneously, as described above. In a typical sorting assembly, there is flexibility in how the different types of sorting modules will be placed in the sorting sequence. For example, in one configuration, multiple Type 3 modules may be placed first in line. Outbound mail will have a short path from the feeder to the sorting stations for outbound destinations. Then, multiple type 2A and 2B modules may be placed next in line. Inbound mail will pass through all of the type 3 stations, and arrive at the type 2 stations where the mail will be sorted to route and temporarily stored in the Type 2 stations. Finally, the Type 1 stations may be placed last in line. Mail previously sorted to route and stored in type 2 stations will then be advanced from the type 2 stations to the type 1 stations for sorting to delivery sequence.

This typical order of the various modules may be selected to minimize the distance the average mail piece needs to travel through the sorter. Other arrangements of the various sorting module types may be made in order to optimize sorter operations to achieve different goals. For example, if only one unloading and traying subsystem is included in the sorter, a customer may want to move the outbound mail closest to the traying station (put type 3 modules last in line) to reduce the amount of time it takes the "tray's worth" of outbound mail collected in the type 3 modules to reach the traying station.

A more detailed description of the three types of sorting modules follows:

Sort to Delivery Sequence Module—Type 1:

For sorting configurations in which sort to delivery sequence is a functional requirement, an average of 5 pieces will be sorted to each address in the US applications, and an average of 2 to 3 will be sorted to each address in typical European applications. A sorter module with 16 to 20 paths between the input side (unsorted mail) and the sorted side is an appropriate design. This will be the most expensive of the sorter building blocks. FIG. 1 shows an example of this type of sorting module, which can be referred to as a sort to delivery sequence module 100.

The module 100 stores and transports mail pieces 103 suspended from clamps (not shown), and the illustrated module may store up to 160 mail pieces for 15 sorting stations, each having a 10 piece capacity. The typical maximum mail piece dimensions for this module would be 12" tall, 15" wide, and 1" inches thick. The module includes drives 105 for individual sorted mail stations, and sorting paths (mail diverters) 110 to those sort stations. A helix spring transition 115 is provided between drive screws of adjacent modules. The module has an input for unsorted mail 120 and also an input for sorted mail 125 from a module upstream from the one shown in FIG. 4. The module also has an output for unsorted mail 130, and an output for sorted mail 135.

This sorting module can be used in a first mode in which only one of the sorting paths is used to divert the mail from the unsorted path to the sorted path. Many, or all, of the other sorting paths will not be used in this first mode of operation. Many of the multiple sorted mail stations will be ganged together to form a single large capacity sorted mail station. This is beneficial for the first step of sorting inbound mail to route, in which typically 3000 mail pieces need to be stored for later processing. The second mode of operation will be used, typically late in the day. In this mode, the mail previously sorted to route will be moved back through the sorter to be sorted to delivery sequence. In this mode, all or most of the diverting paths and address stations will be used—each having a small capacity sufficient to store mail for a single address. In this mode, neighboring address stations might be ganged together to store more mail than a single station is designed to handle. This decision will be made and planned by the master controller just before the second mode of operation is initiated.

Sort to Route Modules—Types 2A and 2B

For applications in which both inbound and outbound mail will be sorted simultaneously, or in applications in which inbound mail only will be sorted first to route, then to delivery sequence in a second pass, the modules used to sort to route will be far simpler than the "Sort to Delivery Sequence" module described above. A sort to route address station, with a storage capacity of say, 600 mail pieces (for application to India Post, for example, where the average mail delivered per route is 500 pieces per day), will actually consist of two stations abutting each other.

Figure 2:
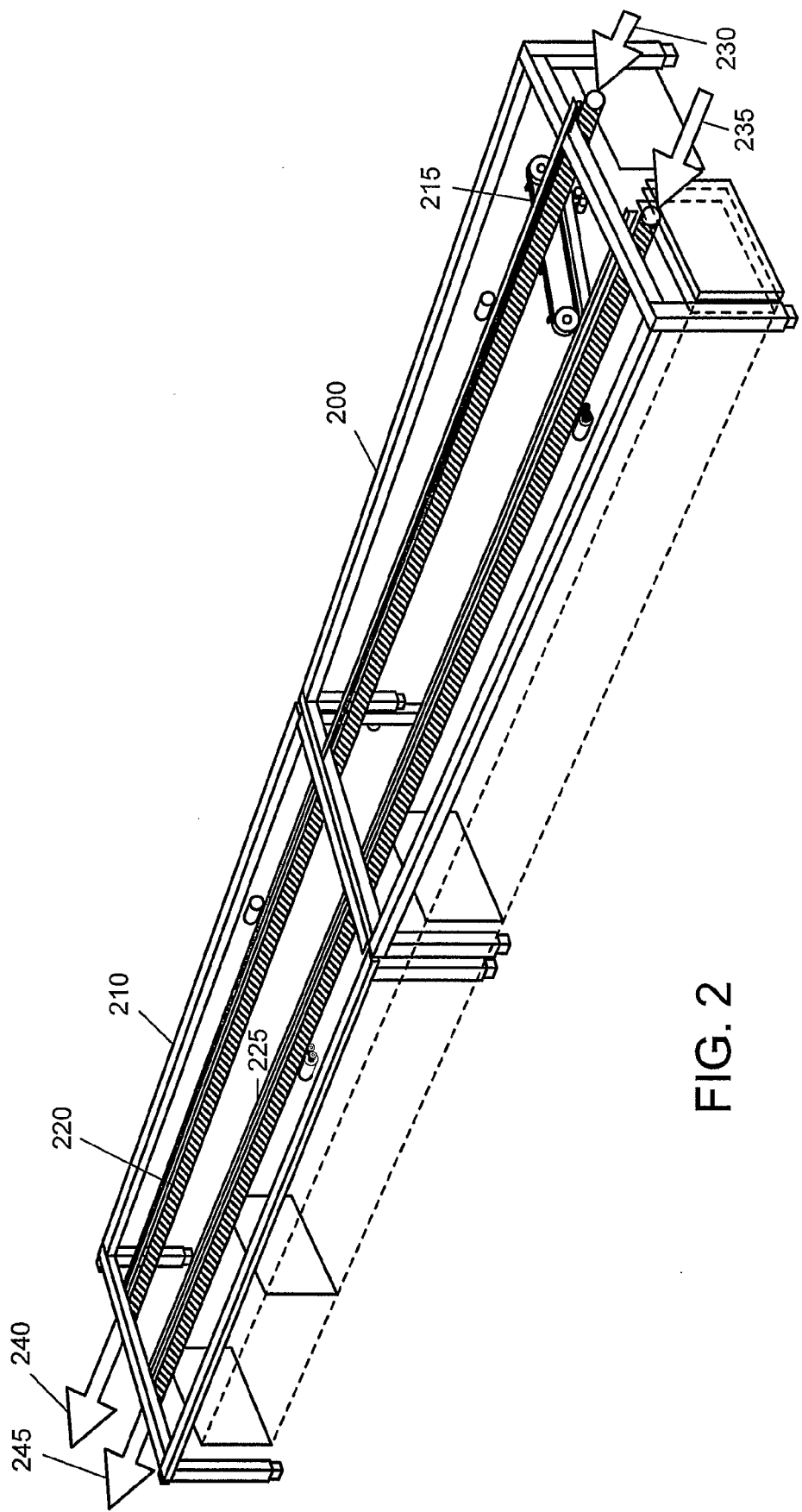
FIG. 2 is a schematic of a sort to route module in accordance with an embodiment of the instant invention.

Referring now to FIG. 2, the first module 200 will have a single pathway 215 to divert mail from the unsorted path to the sorted path, in order to create a single long sort station. The second module 210 will have only two parallel pathways extending the entire length of the module: one path 220 for unsorted mail, and one path 225 for sorted mail. The module 200 includes unsorted mail input 230, sorted mail input 235, unsorted mail output 240, and sorted mail output 245. For European and US implementations, where the mail per route is a higher number, additional type 210 modules can be added until the appropriate capacity is achieved.

Note that the frame, the mail diversion path between the unsorted and sorted mail paths, and the lead screw, drive mechanisms, etc will all be common with type 1 modules. But, fewer diversion paths are required, so that the cost of these modules will be substantially less than the type 1 modules.

Sort a Trayful Module—Type 3:

Type 3 sorter modules will be used when the sorter needs to sort outbound mail in a standard sortation (pass thru) mode of operations. The incremental value brought by this sorter configuration is the automated unload feature. Once enough mail has been diverted from the unsorted path to a sort station, that mail can then be moved to an automated unload and traying station, thereby emptying the sorting station to begin receiving mail for the next tray full.

In previous configurations of this sorter, once the mail was sorted, all the mail in the sorted mail path moved to the automated unload and traying station in the same order as it was originally sorted. In this pass thru mode of operation, the mail from any sort station may need to bypass all the mail being accumulated in sort stations downstream to move to the unload station (since the sort stations downstream may not be filled with one tray's worth of mail yet.) Therefore, there must be a pathway to allow mail upstream to bypass the not yet filled sorting stations downstream. We can think of the sorted mail station as an interim storage area between two pathways.

In the configuration below, the transfer path from the unsorted mail path to the sorted mail accumulated area is identical with the mechanisms used in types 1 and 2 modules. The capacity of the interim storage area is typically about 300 mail pieces (assuming a US sized mail tray.) So, this will be nearly as long as the length of the module (300 pieces at 5 per inch will require 60" of storage area).

Figure 3:
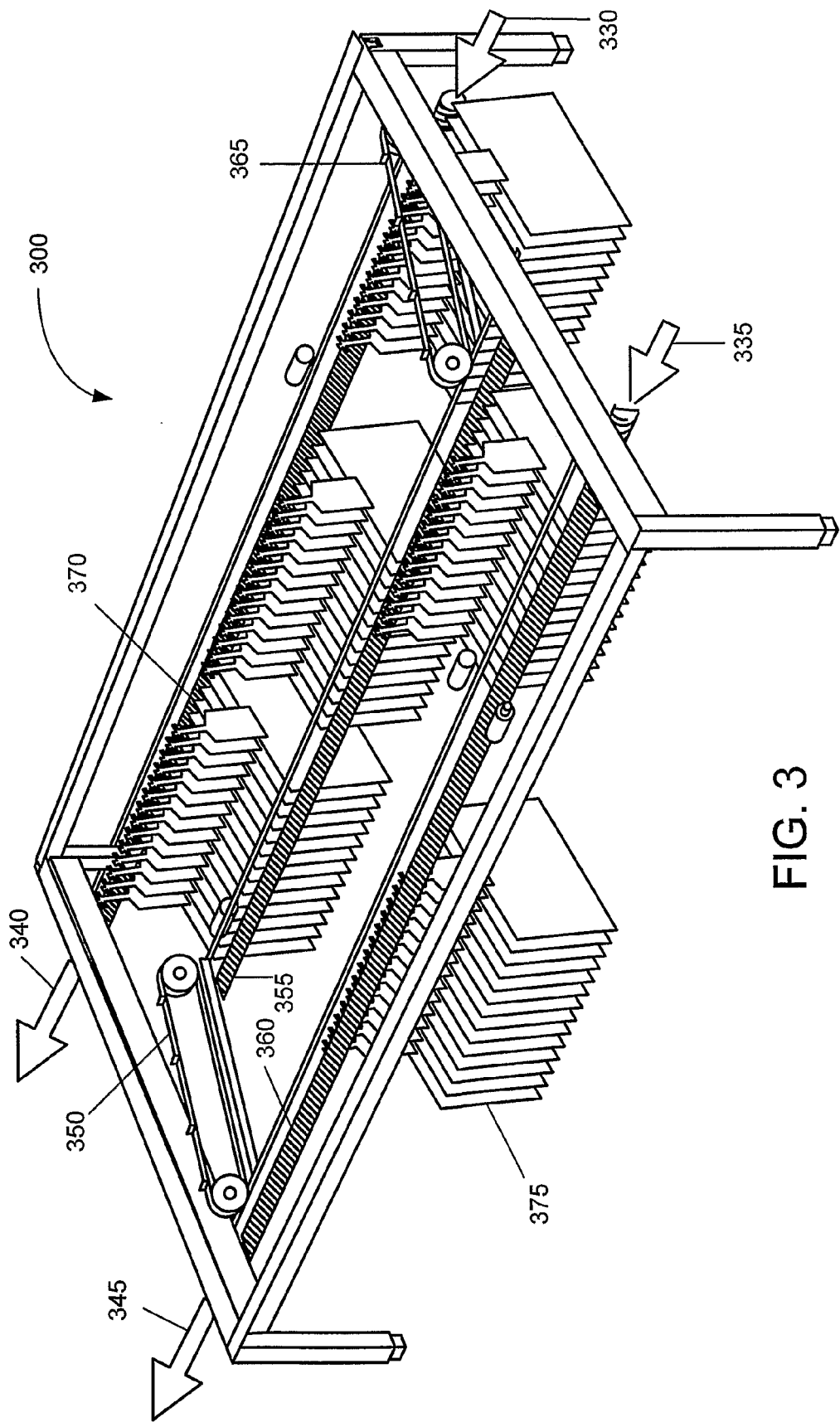
FIG. 3 is a schematic of a sort to trayful module in accordance with an embodiment of the instant invention.

The pathway from the interim storage path to the output path for sorted mail requires a new mechanism for moving mail. Details for this junction mechanism are shown in FIG. 3 which illustrates a sort to trayful module 300 that can alternatively be used as part of a fulfillment system (as described above). The module 300 includes unsorted mail input 330, sorted mail input 335, unsorted mail output 340, and sorted mail output 345. A diverter path 350 is for moving sorted mail from a middle (storage) path 355 to a third (transporting) path 360. A second diverter path 365 is for culling mail from an unsorted path 370 to the middle path 355. The middle path 355 can store a sufficient number of mail pieces to fill one tray. Also shown in FIG. 3 is a sorted batch 375 moving from an upstream module towards an unloader, bypassing the mail being stored on transport 355.

Arranging these three types of sorting modules into a sorting system will result in a large sorter configured for centralized sorting applications. There are various benefits of using such sorters in place of the current state-or-the-art sorters in centralized sorting facilities such as at Wallingford, Conn. Using the multi-algorithm, full escort sorters as provided by various embodiment of the present invention will create the following benefits for the USPS, and similar benefits for other posts.

10 Merged Mail Sorters can replace 25 current sorters

Newspapers can be sorted automatically, not manually

Only 20% of floor space is required for sorting equipment compared to current system Eliminate interim traying: entire tray transport, storage, and retrieval system can be eliminated Number of sorter operators can be reduced from about 72 to about 15 per shift. ($2 B/year savings)

Figure 4:
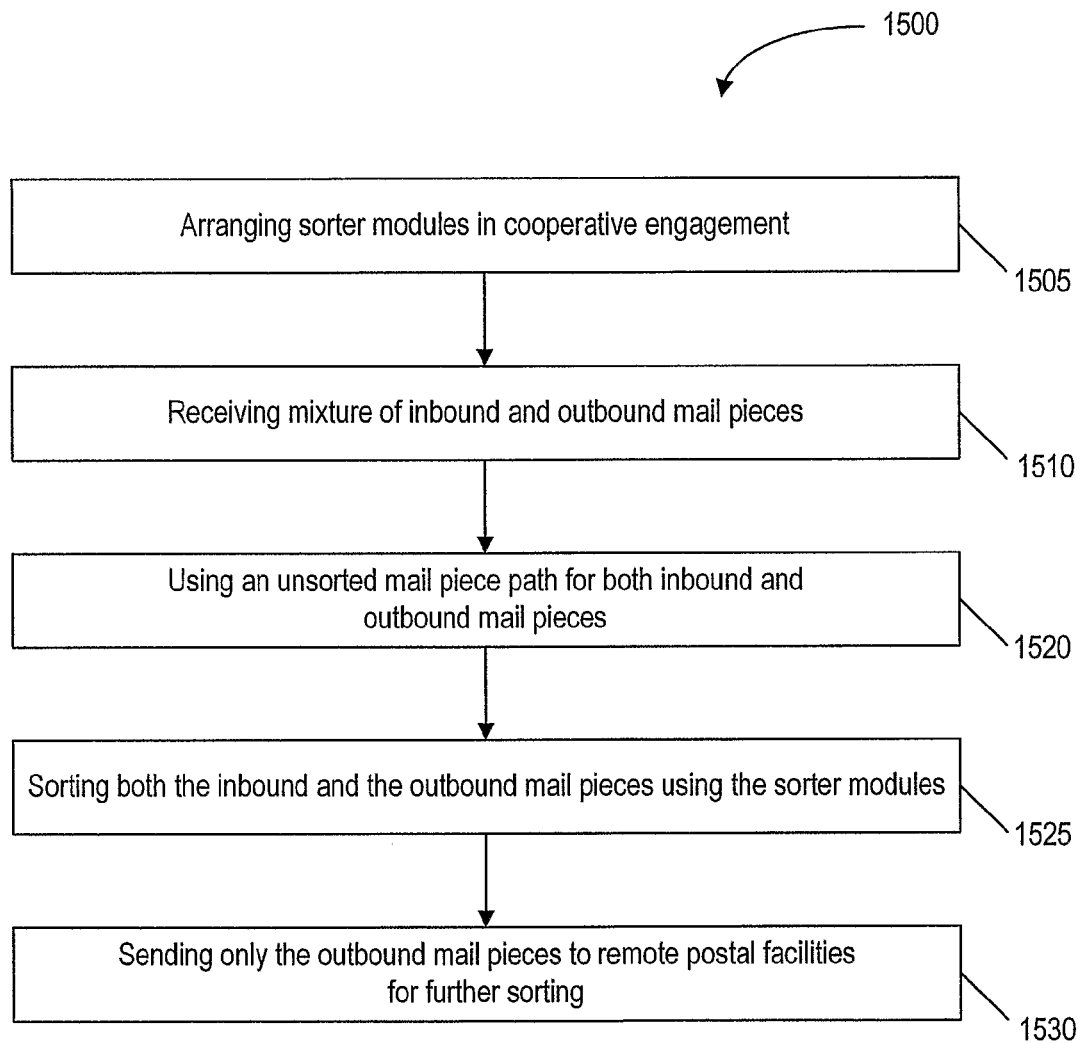
FIG. 4 is a flow chart of an integrated escort sorting method according to an embodiment of the present invention.

Referring now to FIG. 4, a flow chart illustrates a method 1500 according to an embodiment of this invention. Sorter modules are arranged 1505 in cooperative engagement with each other. Then, a mixture of inbound and outbound mail pieces are received 1510. An unsorted mail piece path is used 1520 for both inbound and outbound mail pieces. Both the inbound and the outbound mail pieces are sorted 1525 using the sorter modules. Subsequently, only the outbound mail pieces (and not the inbound mail pieces) are sent 1530 to remote postal facilities for further sorting.

Figure 5:
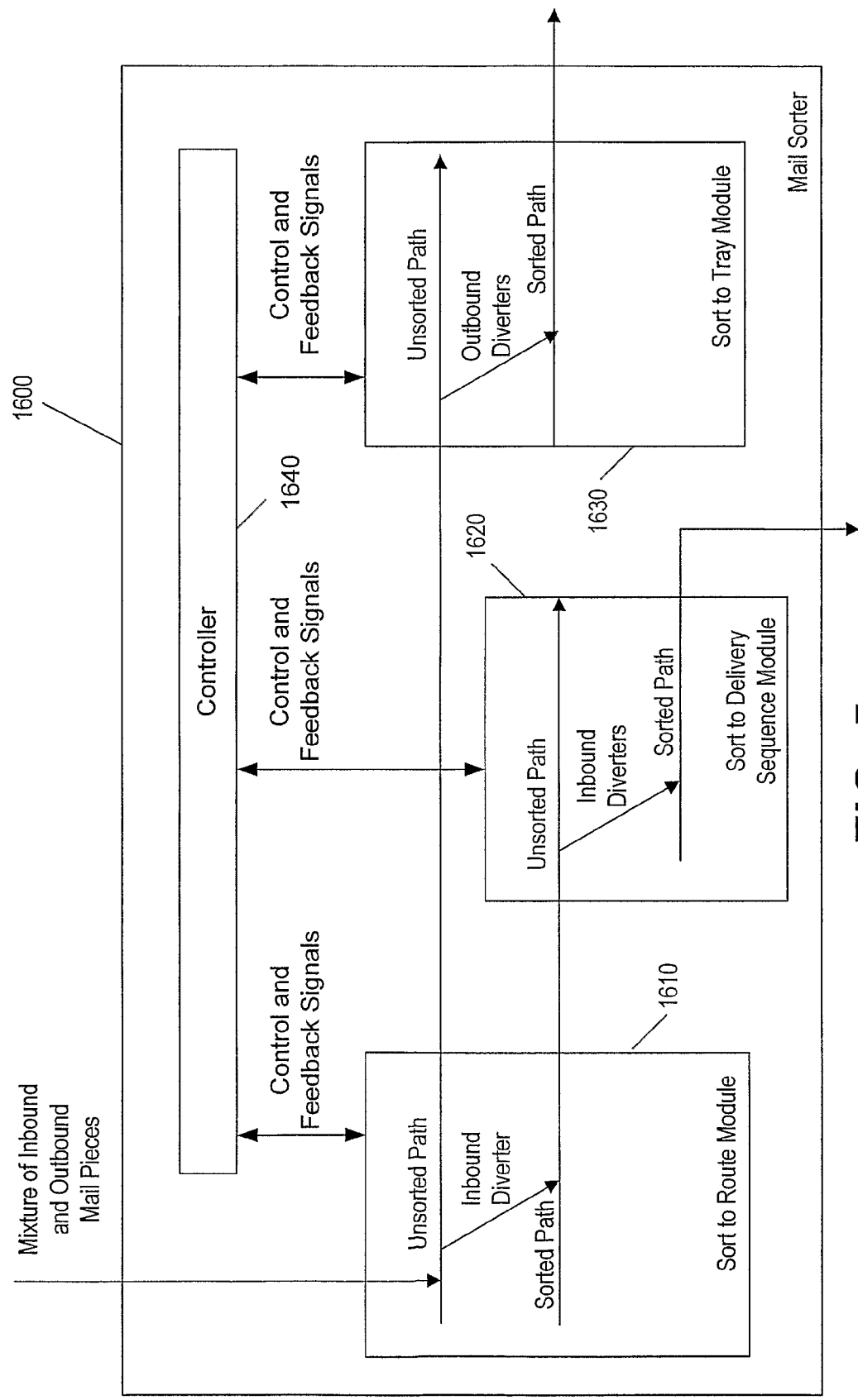
FIG. 5 is a block diagram showing an integrated escort sorter according to an embodiment of the invention.

Referring to FIG. 5, a simplified block diagram is shown, in order to illustrate a mail sorter 1600 according to an embodiment of this invention. A sort to route module 1610, a sort to delivery sequence module 1620, and a sort to tray module 1630 are arranged in cooperation with each other. A controller 1640 supervises that cooperation, via control and feedback signals to each of the three types of sorter modules. A mixture of inbound and outbound mail pieces is shown feeding into the sort to route module 1610. That mixture progresses along an unsorted path, and inbound mail pieces are diverted to a sorted path within the sort to route module 1610. The sorted path of the sort to route module 1610 carries the mail sorted to route in module 1610 into an unsorted path of the sort to delivery sequence module 1620, and inbound mail is diverted to a sorted path within the sort to delivery sequence module 1620, wherein it is sorted to delivery sequence, and subsequently exits the sorter, as shown. Outbound mail proceeds along an unsorted path to the sort to tray module 1630, and is diverted to a sorted path within the sort to tray module, so that it can subsequently be delivered to a remote postal facility for further sorting.

In a practical embodiment of this sorting system, a plurality of each type of module would be used. A sufficient number of sort to route modules 1610 would be employed so that one module 1610 could be assigned by the controller to receive sorted mail for each route in the sorting algorithm. Similarly, a sufficient number of sort to tray modules 1630 would be employed so that one module 1630 could be assigned by the controller to receive mail for each of the outbound destinations in the sorting algorithm. A sufficient number of sort to delivery sequence modules 1620 would be used, having a sufficient total number of diverters so that mail sorted to route in any module 1610 could be further sorted to delivery sequence when advanced to modules 1620.

Algorithms for implementing this integrated escort sorter can be realized using a general purpose or specific-use computer system, with standard operating system software conforming to the method described above. The software product is designed to drive the operation of the particular hardware of the system. A computer system for implementing this embodiment includes a CPU processor or controller 1640 as shown in FIG. 5, comprising a single processing unit, multiple processing units capable of parallel operation, or the CPU can be distributed across one or more processing units in one or more locations, e.g., on a client and server. The CPU may interact with a memory unit having any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

II. Embodiment of a Fulfillment System

Many businesses these days operate as virtual companies—a development that has been enabled with the advent of Internet sales. In virtual companies, nearly every aspect of the business is outsourced, including the fulfillment function. This has opened the door for new companies, whose business is providing fulfillment services for other companies. Additionally, a number of companies that take most of their orders over the Internet have a very high percentage of their business costs in the fulfillment function. This is not because the cost of fulfillment operations has increased disproportionately, but because the costs of the other functions (sales, marketing, order processing, etc) has been reduced significantly (because of the efficiency of the internet.) It is interesting that a number of posts around the world are either offering or are considering offering fulfillment services as a way of increasing revenues. The posts see this as a logical extension to their mail processing operations. They charge new customers to warehouse (store) products, receive orders, pick products out of inventory, and mail them to the customer.

Fulfillment has always been a vital function in businesses that deal with selling tangible products. Some companies are more efficient than others in performing this function. Investments in automation have typically been limited to the documentation portion of the fulfillment function: using the order information entered into computers to generate billing and invoice documents, and printing labels for shipping the products. These investments have significantly increased the productivity of fulfillment workers. The remaining activities in the fulfillment operations are still quite labor intensive, and therefore expensive. These activities include (but are not limited to): reading and interpreting the order information, identifying where the ordered items are stored in inventory moving to the locations of the stored items, picking the items off the shelves, checking that all ordered items have been collected from inventory, preparing these for shipping, manually packing the items into shipping cartons and applying shipping (or mailing) labels, etc. There is also a quality control function to check that the items being shipped match the items ordered just before the shipping cartons are sealed. Additional labor is required for ordering inventory, logging it into the system, placing it on shelves, and periodically counting and confirming the number of items in inventory.

The high percentage of manual labor in the fulfillment function contributes to the overall cost of doing business. If the cost of labor could be reduced here, the company's profitability could be increased. Alternatively, if the cost of fulfillment labor could be reduced, these savings could be passed onto the customers, which reduces the selling prices of the items and enables the business to grow because it will be more competitive.

The aforementioned provisional applications describe a mail sorting system that can handle mail pieces up to 25 mm thick. These mail pieces are individually clamped in mail clamps, moved via a first path past a number of diverting stations so the items can be sorted, then after sorting is complete, the sorted mail pieces are moved automatically to an unload station where they can be loaded into mail trays. The mail sorting system is modular and scalable so that it can be compressed or expanded to accommodate whatever capacity is needed by the customer.

This same system can be adapted to automate the fulfillment functions for products of a certain size and type. The most obvious types of products, which could be automatically fulfilled using this system, are books, CDs, DVDs, videotapes, and medicines. Other products such as periodicals, articles of clothing, foodstuffs, etc could also be accommodated in this automated fulfillment systems under certain conditions.

The main benefit is that all of the labor associated with ordering and placing inventory, then picking, packing, and shipping ordered items can be reduced dramatically, and replaced with automated processes. The previously disclosed mail sorting system can be easily adapted to automate the fulfillment function.

This embodiment of the present invention uses the system developed for sorting mail as an automated fulfillment system. It accepts inventory, loads each inventory item in a clamp having a unique identifier, automatically moves multiple identical items to a storage location in the sorter (similar to the sorting function), then later retrieves identified items listed on order forms from their various storage locations and delivers them to an unload station. The system works in conjunction with order information processing software so that when the ordered items are automatically "picked" and delivered to an unload station, a shipping envelope or carton having labels with the customer's address and an invoice arrive at the same place at the same time. The process of packing the items in the container could be manual in order to provide a human element to quality control (a final check), or it could be automated with specialized packing equipment. The sorter-turned-fulfillment-system also keeps inventory control, can automate the re-ordering process when inventory of any item reaches a certain threshold, and can be scaled up to accommodate additional items as the business grows.

The major benefit of this embodiment is reduction of substantial costs for labor, and increase in the efficiency of the entire fulfillment process. A document management system can be incorporated so that the entire process of order fulfillment can be automated and commanded from a computer console. Because the inventoried items are clamped during storage and transport, the system will be highly reliable and tolerant of a wide variety of shapes and sizes of inventory items.

In the aforementioned provisional applications, three sorting building blocks were described in which a type 3 sorter module is used when the sorter needs to sort outbound mail in a standard sortation (pass thru) mode of operations. This was shown in present FIG. 3. The type 3 sorting module has three transporting pathways for the mail: a first pathway to move the mail past the sorting station, a second pathway which serves only to store sorted mail until one tray full is accumulated, and a third pathway to move the tray's worth of sorted mail past any downstream sorting stations and to deliver it to the unload/traying station. Additionally, diverter paths are provided to move the mail between the three transporting paths. These three paths are shown in FIG. 3. The module 300 includes unsorted mail input 330, sorted mail input 335, unsorted mail output 340, and sorted mail output 345. A first diverter path 350 is for moving sorted mail from a middle (storage) path 355 to a third (transporting) path 360. A second diverter path 365 is for culling mail from an unsorted path 370 to the middle path 355. The middle path 355 can sort and store up to three hundred pieces of mail (one tray full). The sorted batch 375 moves from an upstream module towards an unloader.

This same module 300 can be adapted to serve as an automated fulfillment system. For the sake of simplicity, only four modules will be shown in the example below. But, as with the previously disclosed sorting system, any number of these modules can be assembled together to scale up the system to match the desired capacity. As with the mail sorter, the modules can be arrayed in any fashion desired by the customer: linearly, in a racetrack configuration, and stacked in multiple tiers to minimize footprint requirements.

It will be evident that the capacity of the middle path can be adapted to any capacity that is needed. In this current example, we have modified the mail sorting version to include two storage areas per middle path, rather than one area shown in the mail handling version. It will be appreciated that any number of stations from one (as with the mail module), to about 20 interim storage stations could be included in the middle path. Each of these would have a first diverter path to move items from the first transport path to the middle path, and a second diverter path to move items from the middle path to the third path.

Figure 6:
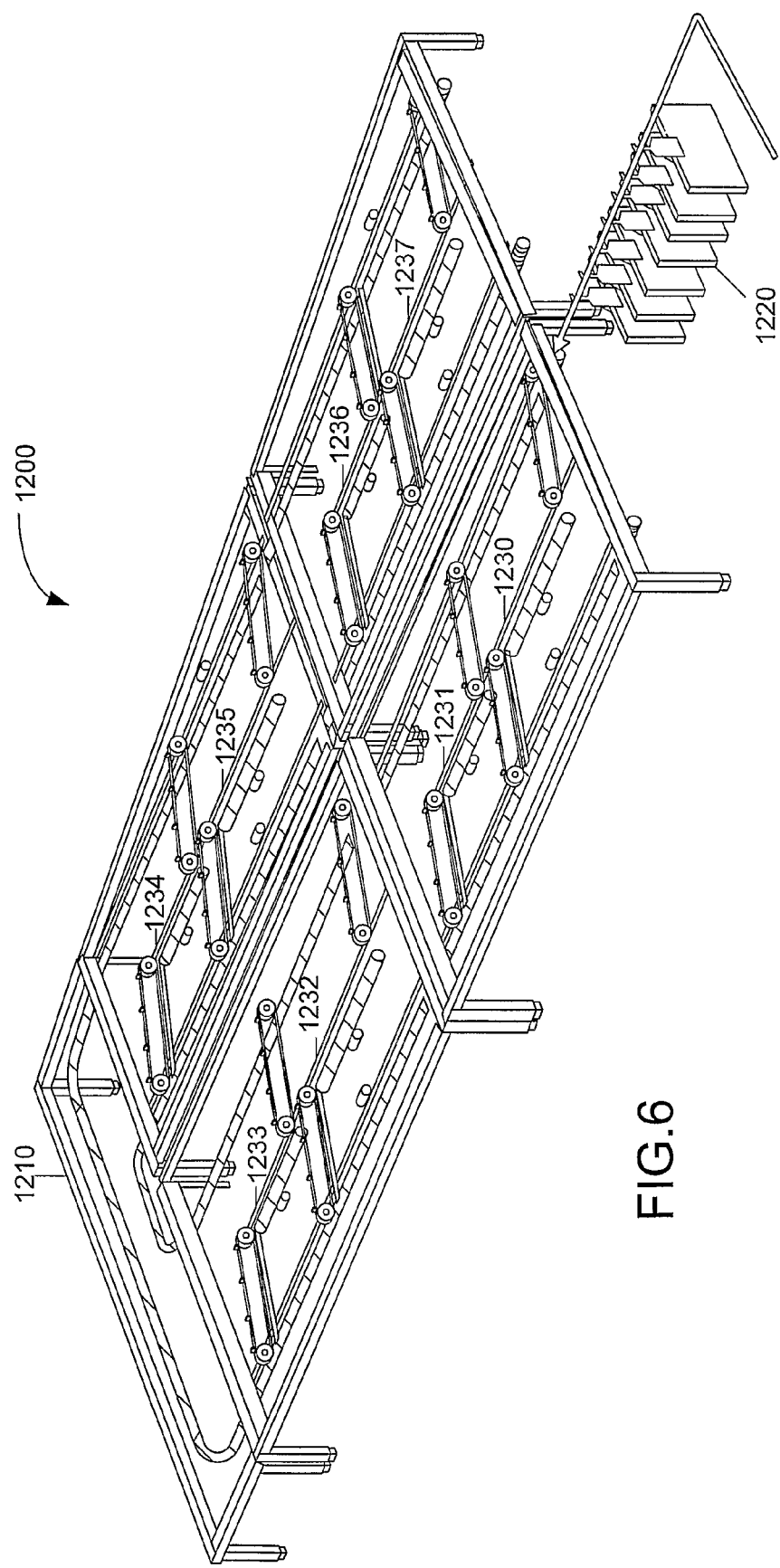
FIG. 6 is a schematic of a fulfillment inventory modules with storage areas for storing inventory items until needed in accordance an embodiment of with the instant invention.

In this present, simplified example, with two storage areas per module, and four modules per system, a total of eight batches of inventory items could be loaded into the sorter, stored until needed, then automatically delivered in smaller quantities to the output area to fulfill an order. FIG. 6 shows a system 1200 of four fulfillment inventory modules, each having two storage areas for storing inventory items until needed. As seen in FIG. 6, a turn module 1210 has been added to move items in the first and third paths from the second to the third fulfillment module (type 3). FIG. 6 shows what the simplified system looks like when empty, with inventory 1220 about to be loaded. Only three of these eight storage areas 1230 thru 1237 will be used in the following example. For loading the fulfillment system, the operator takes new inventory, scans it, loads each piece into a clamp, and ingests the clamped item into the fulfillment system in the same way as clamped mail is loaded into the sorter system. The mechanism for accomplishing the clamping operation is not shown. It could be a manual, automated operation, or semi-automated operation. The essential steps are scanning an identifying bar code on each piece of inventory, clamping it, and moving in into the fulfillment system on the first path.

In the same way as a sorting system operates, the first path moves all of the clamped inventory past the diverter stations on the first path, diverting each item to the proper storage area, and passing the items from module to module until all of the clamped inventory has been diverted into its proper location for storage.

Figure 7:
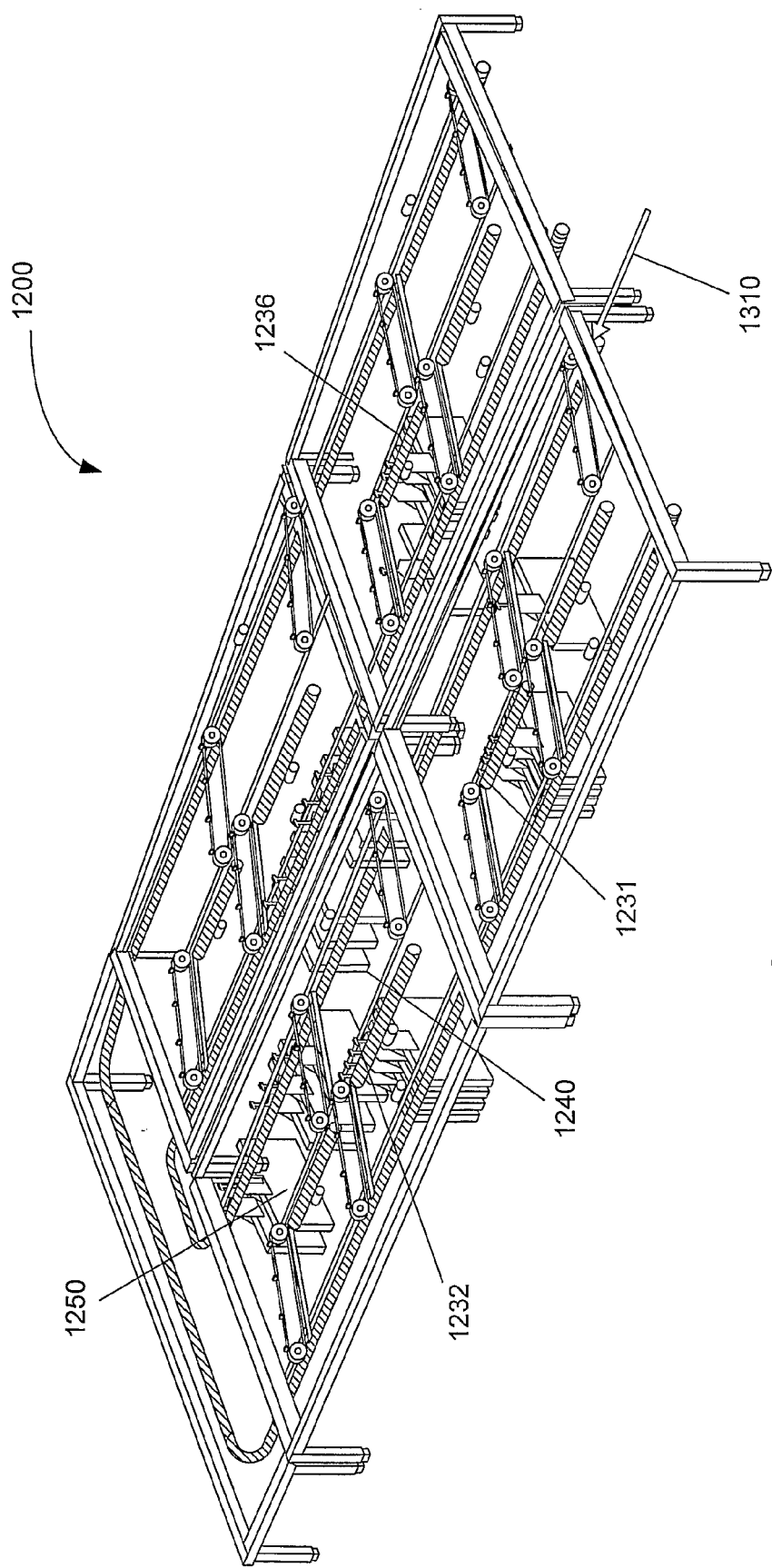
FIG. 7 is a schematic of the fulfillment inventory modules of FIG. 6 showing a stream of intermixed inventory moving down a pathway, and being diverted into the three storage areas.

In the simplified example, it is assumed that books are the inventory items being loaded into the fulfillment station. In this example, there are three types of books (types A, B, and C). As inventory is loaded into the fulfillment system in any order, the system transports the inventory items, and diverts them into the proper storage places. FIG. 7 shows the fulfillment inventory modules of FIG. 6 wherein a stream of intermixed inventory moves down the first pathway 1310, and is diverted into three storage areas 1231 for type A books, 1232 for type B books, and 1236 for type C books. Meanwhile, unsorted inventory items 1240 and 1250 on the first pathway 1310 move past the diverter paths.

After inventory is loaded into the fulfillment system, the operator can enter an order at a control panel to deliver any combination of items to fulfill a specific order. For example, if a first order entered is for type A book stored in area 1231 and two type C books stored in area 1230, the fulfillment system will move these items from their respective storage areas in the middle pathway to the third (outermost) pathway, which will transport the items to the output area. Meanwhile, a second order for a type B book could be entered. As soon as the items from the first order pass the storage area for the type B books stored in area 1232, the fulfillment system will command the type B book to be moved to the third path for delivery to the output behind the first order.

Figure 8:
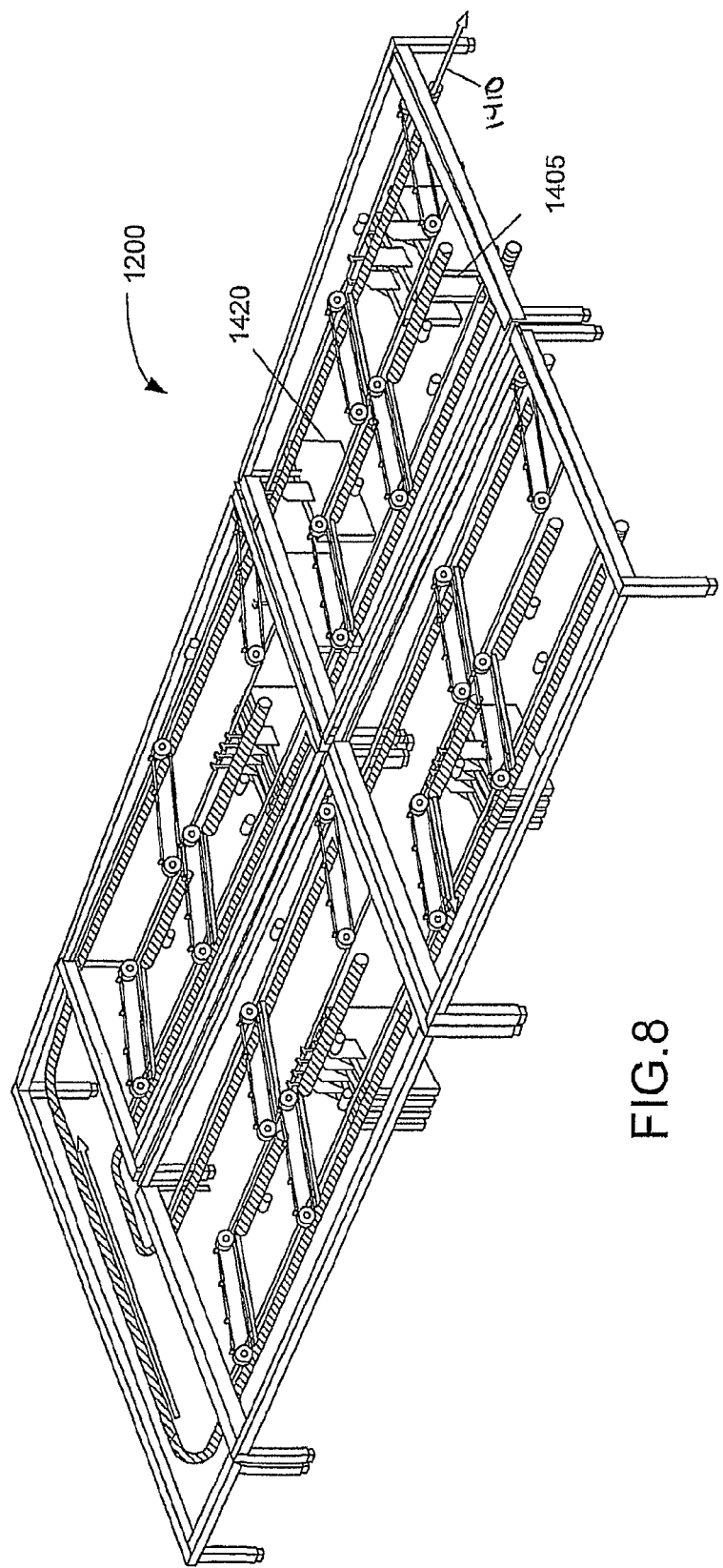
FIG. 8 is a schematic of the fulfillment inventory modules of FIG. 7 showing a first order nearing an output, and a second order in the process of being moved to a third (outer) transport prior to delivery to the output area.

Referring now to FIG. 8, the fulfillment inventory modules of FIG. 7 are again shown, with a first order 1405 nearing an output 1410, and a second order 1420 in the process of being moved to a third (outer) transport prior to delivery to the output area 1410.

When the items are delivered to the exit area, a compatible system (not shown) will deliver a shipping container (envelope, carton, box, or the like) along with the shipping address, postage, and an invoicing sheet. This system can be automated and controlled so that the ordered items and the prepared shipping carton all arrive at the exit area simultaneously. The act of inserting the contents into the shipping carton can be manual or automatic.

Today, most fulfillment operations are manual operations—usually done on foot by low paid workers. For some companies, the "pickers" have in the past used roller skates to speed up their ability to walk through vast inventory areas in search of the correct items to fulfill orders. The above proposal automates both this process and the inventory storing process.

III. Macro Sorter Embodiment

As previously described, centralized sorting centers such as the USPS facility at Wallingford, Conn. process inbound mail (mail collected locally plus mail sent from other sorting centers) and outbound mail (mail collected locally, destined for other sorting centers). The USPS has invested heavily in automating the sorting center. Today, this sorting center operates round the clock in 3 shifts, and handles mail volumes of 5.5 million letters every 24 hours. To accomplish this level of volume, Wallingford currently has 18 Delivery Bar Code Sorters (DBCS), each with 206 bins, and a feeder that is rated at 40,000/hour. It takes 2 operators for each sorter unit for each shift.

This invention increases efficiency, lowers the risks of jams and damage to the mail pieces during processing, reduces the labor required for sorting, reduces the number of pieces of sorting equipment required, and reduces the floor space required, all while processing the same amount of mail in the same amount of time. The novelty of this embodiment of the instant invention is in separating the multiple feeders from multiple sorters, and providing pathways from each feeder to each sorter. In this way, the multiple pieces of sorting equipment operate together in the equivalent of a single, macrosorter.

One embodiment of the instant invention is directed to high volume applications with the escort sorter described in the aforementioned provisional applications. But, more importantly, this embodiment of the instant invention also works well on conventional sorters.

Centralized sorting facilities typically have multiple pieces of sorting equipment, each having one or more feeders. Each feeder is capable of singulating and reading the addresses on mail pieces, and then advancing the mail pieces into a mail sorter uniquely paired with the one or more feeders. Each mail piece is typically fed through the sorter multiple times. The improvement described herein dramatically improves the sorting efficiency by separating multiple feeders from multiple sorters, and providing pathways from each feeder to each sorter.

This arrangement will reduce the number of sorters required, reduce the number of times each mail piece must be sorted, reduce the total labor required for sorting, reduce the floor space required for sorting equipment and mail storage, and substantially improve the efficiency of the entire sorting operation.

The sorting algorithms used at centralized sorting facilities are highly customized based on historical volumes of mail going to various destinations. In the USPS network, there are 387 centralized sorting facilities. But, based on historical averages, the USPS knows only a certain number of these centralized sorting facilities will receive relatively high volumes of mail collected in Connecticut (examples: New York, Massachusetts, New Jersey, etc). Others will typically receive moderate volumes of mail. And perhaps as many as half of the centralized sorting facilities may receive very small volumes of mail originating in Connecticut (examples: South Dakota, Idaho.) Likewise, for international mail, some countries will receive a significant volume of mail originating in Connecticut (examples: England, Germany, Canada, et cetera), and other countries will receive very small amounts (examples Romania, Botswana, etc.)

As a rough approximation, about half the mail sorted at Wallingford is outbound mail (destined either for other countries or other sorting centers), and half is retained for distribution within the Wallingford delivery area. For comparative purposes, we can assume that about half the outbound mail (one fourth of the total mail volume) needs to be sorted only once, and the other half (one fourth of the total) needs to be sorted twice before being sent off to other sorting centers or international destinations. The half of the mail that is destined for the delivery area served by Wallingford must be sorted a total of three times, whether it originated in the Wallingford area, or it came in from other sorting centers. Given these approximations, the average piece of mail passing through Wallingford must be sorted 2.25 times.

Interestingly, this information can be used to determine that the actual operation of Wallingford is about 71% efficient when processing letter mail. There are 18 Delivery Bar Code Sorters at Wallingford, each capable of feeding letters at 40,000 per hour. So, in any 24 hour period, the sorting center should be capable of sorting 18 sorters×24 hours×40,000 feeds per hour/2.25 feeds per letter=7,680,000 letters at 100% efficiency. Since Wallingford capacity is only 5,500,000 letters in 24 hours, it can be calculated that the aggregate efficiency of the sorting operations is 71%. Another way to state this is that the actual hourly rate will be 28,400/hour, not 40,000 rated sorts per hour.

Figure 9:
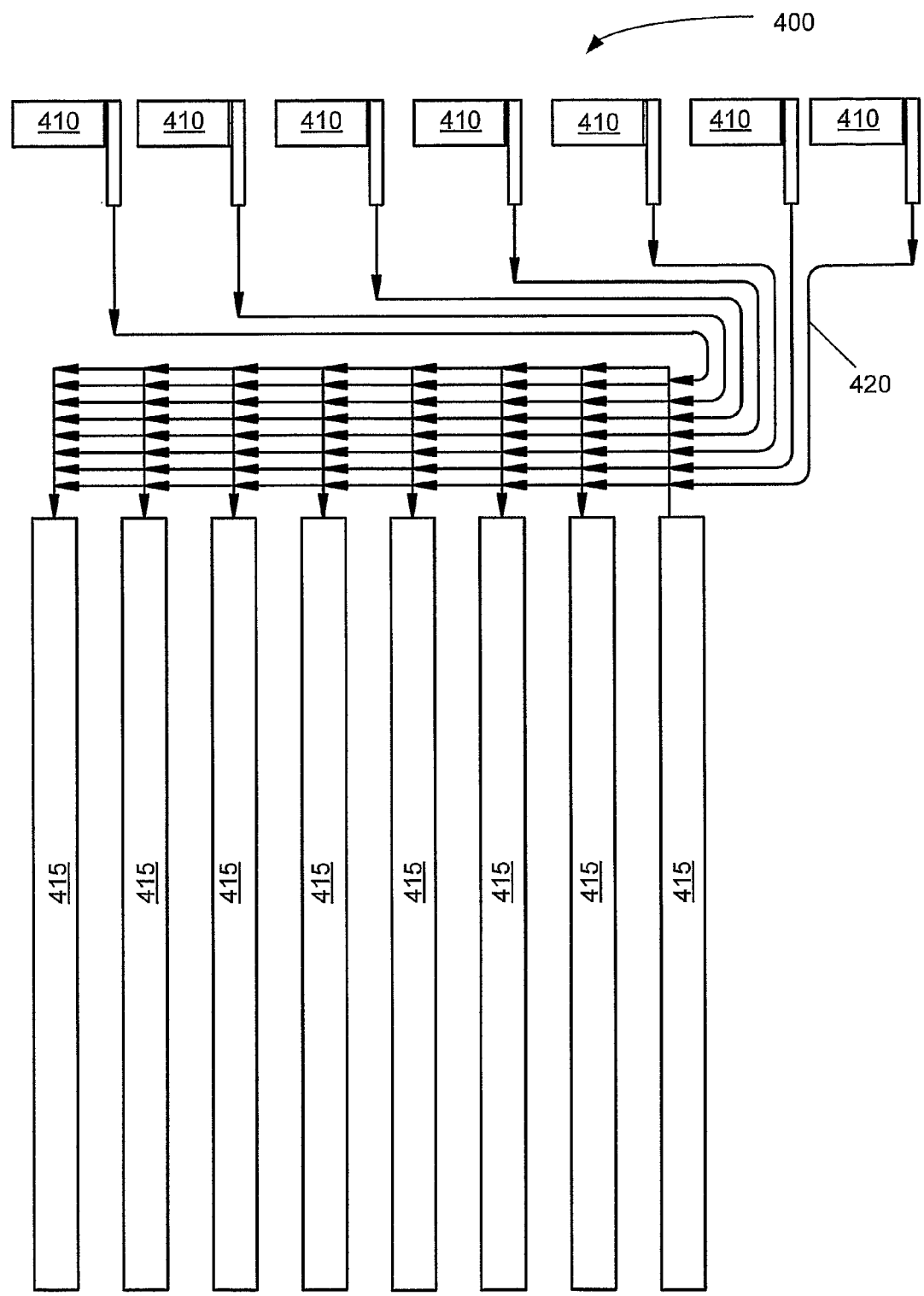
FIG. 9 is a block diagram of a macro sorter with pathways from multiple feeders to multiple sorters.

This embodiment of the instant invention is a system and method for making all of the sorters in a centralized sorting facility operate together to form a single sorter with a much higher number of sorter bins and a higher level of efficiency. This arrangement will reduce the number of times the average mail piece must pass through the sorter, or be loaded and unloaded. It will also reduce the number of sorters required to achieve the same daily capacity. This arrangement will save dramatically on labor and the substantially reduce the number of jams and damage to mail pieces. Referring now to FIG. 9, a block diagram shows a macro sorter system 400 with pathways from multiple feeders to multiple sorters. Each of the feeders 410 may include a reader, and each of the sorters 415 may be a Delivery Bar Code Sorter (DBCS). There is a pathway 420 from each of the feeders to all of the sorters. Feeders 410 may be manual or automatic methods of inputting mail into the system.

According to this embodiment of the instant invention each feeder is separated from each sorter, and provided a pathway from each feeder to each sorter. So, for example, while Wallingford currently has 18 Delivery Bar Code Sorters (DBCS) each with its own feeder (and reader), and each with 206 bins, this new arrangement will enable the same volume of mail to be processed with only 12 sorters. When a pathway is created from each feeder to each of the 12 Delivery Bar Code Sorters, this essentially creates a single sorter with 12×206=2,472 bins.

Rather than having to allocate bins based on historical volumes, the bins can be allocated with much simpler algorithms. For example, 386 bins might be allocated to the other centralized sorting centers within the USPS, and another 200 allocated to specific foreign country designations. With these assignments, all outbound mail (50% of the total volume) will need to be sorted only once. This also leaves 1,886 bins available for sorting inbound mail (for delivery within the Wallingford delivery area.) The Wallingford distribution area has approximately 600 individual routes, each having about 600 addresses. So, one algorithm for this Macro-sorter would be to assign three bins for each route during the first pass, each for 200 addresses, for a total of 1800 bins. The remaining 86 bins could be assigned for anything else that makes sense, but will not be needed for this example. After all the mail is fed only once, half of it is sorted to the outbound destinations, and the other half is sorted to ⅓ of each route (200 addresses sorted per bin assignment.) This sorted-to-⅓-route mail must be fed one last time to be sorted to delivery sequence. Each one-third route can be fed within a single sorter for the last pass.

Thus, each outbound mail piece (50% of total volumes) needs to be sorted only once, and each inbound mail piece (50% of total volumes) needs to be sorted only twice. Overall, each mail piece is sorted an average of only 1.5 times—using only 12 sorters. This compares with the existing situation for the same volume of mail (5,500,000 pieces per 24 hour period) which requires 18 sorters sorting each piece an average of 2.25 times.

In this example, the same mail can be sorted on two thirds of the equipment, requiring only two thirds of the floor space, and two thirds of the operators. More importantly, if we can think of Wallingford as an average sized sorting facility (which it is), then the annual savings by eliminating the labor to operate the 6 sorters that are not needed can be calculated as follows: 2 operators×6 sorters×3 shifts×387 sorter centers× $45,000 annual salary and benefits=$627 million savings per year. Additional savings will occur by reducing the total floor space required, reducing managerial staff, selling un-needed sorting equipment, and the like.

IV. Value Added Service Products for Posts using Merged Mail Sorter

Posts are under considerable pressure to maintain or increase revenues and profits in the face of mail volumes that are predicted to decline, or at least to stop growing. Most posts are looking for value added services that can be offered to customers for incremental charges. Such services as insurance, confirmation of delivery, registered mail, etc, have been in existence for a long time. The charges for these services are significantly higher than ordinary postage, but they also require considerable expense since many of the steps involved in processing mail with these value added services require significant amounts of manual labor for filling out forms, scanning, tracking, and other special handling operations.

Additional value added services would be desirable to provide additional sources of revenue for the posts. For example, if the current location of any mail piece within the postal system could be identified quickly, and the piece retrieved or acted on electronically or manually, additional services such as re-routing the piece to a different address, stopping delivery of the piece, returning the piece to the sender before attempting to deliver it to the addressee, or guaranteeing delivery at a specific time on a specific day could all be offered by the posts for additional charges in order to increase the postal revenues. It is difficult to consider offering these services today because of the difficulty in finding a specific mail piece once it has entered the postal processes.

With the current sortation equipment used in the USPS and other posts around the world, individual mail pieces with unique identifiers such as planet codes are identified only when they pass a certain point in the process. After passing those points, there is no way, short of manual searching for specific mail pieces, to retrieve a mail piece for various desirable modifications. It is known to approximate the location of any single mail piece as having passed a certain point in the process, but not yet having passed the next point in the process. If a specific mail piece with a unique identifier such as a planet code is needed, the next point at which the codes on the mail pieces will be read could be programmed to look for a specific identified mail piece when it passes the downstream reader. A diverting transport could be installed at that point to cull the specific mail piece out of the mail stream so that it can be acted on. But this may involve considerable delays between the time the service is requested by a postal patron and the time the mail piece might actually be identified. Also, the mail piece could have moved to a different city by the time it passes by the next planet code reader—and in some value added services, it may have to be sent back the way it came. This adds cost and delays. It would clearly be preferred to find the mail piece as early in the postal process as possible.

One of the attributes of the full-escort merged mail sorter described in the aforementioned provisional applications is that the location of each mail piece can be made known at every point between the first time it enters a sorter until it is actually delivered to the addressee. The sorting process starts with scanning information on the face of the mail piece, including all postnet bar codes, planet codes, IBIP information, address information, and anything else that the scanning software is equipped to interpret. This information is associated with a unique identifier on a clamp, and the mail piece is loaded into the clamp. Throughout the sorting process, the exact location of the mail piece is known by the controller on the sorter. In some centralized sorting operations, the mail piece may be retained by the sorter for up to 21 hours in the normal sorting operation. During this time, if any mail piece with a unique identifier such as a planet code needs to be retrieved at any time, it can be retrieved by the sorter and returned to the sorter operator by simply entering a command on the sorter user interface. The aforementioned provisional applications also describe the concept of associating all information on mail pieces in the sorter with a unique identifier on the mail tray into which the sorter stacks the mail pieces as the last step in the sorting operation. Thus, even after the mail piece has left the sorter, it can still be isolated to a specific mail tray with a unique identifier. When this tray is loaded into a truck or airplane for transport to a different destination, the identity of all mail trays loaded in the transport can be associated with an identifier on the transport.

Thus, additional value added services can be offered by the posts to generate additional revenues based on this ability to isolate and act upon a single mail piece with a unique identifier while it is anywhere within the postal processes. These value added services may include the following: re-directing a mail piece to a new destination; stopping the delivery of a mail piece; guaranteeing the delivery of the mail piece at a certain time on a certain day—before or after the piece is inducted into the postal system.

Re-directing a mail piece to a new destination can be a valuable service to a postal patron who has recently mailed an important mail piece, and then realizes that the address was incorrect, or the addressee has recently moved, or the addressee is temporarily at a different location. Today, the posts can do nothing to correct the situation. The mail piece will be delivered to the original address. With the proposed system, the posts can find and identify the mail piece wherever it is in the postal process, modify the address on the mail piece, and divert it to be delivered to the new address. This service can save the postal patron days, not to mention the difficulty of retrieving a mail piece once it has been delivered to the original address. If, for example, the address is a residential home with a "slot in the door" type mailbox, and the addressee has moved, or is on a trip—there may not be a way to retrieve the mail piece within a short period of time. It would be worth a premium payment to the post to prevent this situation from occurring in the first place, and redirect the mail piece to the revised address.

Stopping the delivery of a mail piece could be a valuable service by the post for a postal patron who may have regrets about the contents of a mail piece after dropping it in a mail box. Today, there is no way to stop the delivery of that piece. The post could charge an extra fee for finding the mail piece wherever it is in the postal process and either destroying it, or returning it to the sender. Some examples of where a postal patron may welcome using such a service may be a nasty letter written to a relative, lover, or a boss; a check with too many zeros, or too few; or an order form for an expensive product that the postal patron later realizes that he/she cannot afford. This may become a valuable differentiator between email and physical mail.

Another value added service made possible by this embodiment of the instant invention is that a postal patron could order delivery of the mail piece to be guaranteed at a certain time on a certain day—before or after the piece was ingested into the postal system. The post could identify the exact location of the mail piece and take appropriate action to either provide special handling to speed up processing of that piece, or cull the mail piece out of the normal processing in order to delay delivery. This service may be valuable to a merchant who wants to time the arrival of the piece with a sales event or a telephone call. It could be valuable to insure the arrival of a piece on the addressee's birthday—not a day before or a day after. It could be a valuable service to a sender who wants to insure that the funds to cover a check are in the checking account before the check arrives at the address. The timing of the delivery may be defined relative to another mail piece, for example, request to deliver a given mail piece only after, or at the same time with another mail piece.

Additionally, each of these services could be provided either at any postal counter, or by interacting with the postal web site. All that is required is the unique identifier placed on the mail piece before it was originally posted.

The present invention is a system and method for offering value added services for mail after the mail piece has been ingested into the postal delivery system. Using the aforementioned merged mail sorting system, unique identifiers on each mail piece are associated with unique identifiers on the clamp used in the sorting system, with the tray holding the mail while it is being transported, etc. This enables the postal employees to find each mail piece at any time. The posts can charge patrons for value added services based on this new capability in order to re-direct any mail piece with a unique identifier to a different address than the one on the mail piece, stop delivery and/or return the mail piece to the sender, or guarantee delivery at a specified time. These services can be offered at postal counters, or by using the postal website.

This embodiment of the instant invention enables the post to charge additional revenues for value added services which could not have been offered previously. If the mail piece is in the aforementioned sorting system, it can be retrieved automatically by simply entering a command in the user interface. If it is in a mail tray in transit, the mail tray location can be identified by querying the postal data base.

In order to create the value added services, the aforementioned sorters could easily be modified to include a "go fetch" command for a specific mail piece known to be in the sorter. In some sorting algorithms, for example, sorting of inbound mail using batch algorithms, the mail piece may be retained inside the sorter for as long as 21 hours. In this case, the location of the specific mail piece may be known. But it could be embedded in a batch of mail previously sorted to route. In order to fetch a specific mail piece, all the mail stored for that route may be moved past a stacker module. All but the piece desired to be fetched will then move back into their original stored position. The piece to be fetched could be unloaded to a mail tray and the mail tray with the single piece in it delivered to the operator. In pass-thru algorithms, the sorter will move a tray's worth of mail to the stacker system every time a tray's worth of mail has been collected. If the piece desired to be fetched is located in one of these batches, it can be placed in a separate tray as soon as the batch reaches the traying subsystem.

For retrieving mail pieces loaded into mail trays with unique identifiers, a system tracking software package is assumed to know the location of each tray (waiting in area XX for dispatch, loaded on a truck, on its way to destination YY, etc). For fetching specific mail pieces under these circumstances, the system tracking software would identify the specific current location of the mail tray holding the mail piece to a postal employee, who would then go directly to the mail tray and manually search for the piece known to be in that tray.

In either of the above cases, the postal employee will take action on the mail piece depending on the value added service requested. Generally, these actions may include re-writing the new destination address, writing the original senders address in the delivery address position, marring the postnet bar code, or simply setting the mail piece aside for expedited handling or delayed handling.

The ability to provide real-time feedback to the customer regarding the possibility of acting on the specified mail piece is also valuable. In existing systems, there is a high degree of uncertainty about the location of a specific mail piece until the next sorting event.

A version of this concept could be employed using a variation of existing sorting equipment having the ability to read planet codes. The planet code readers on the expected path of the mail piece could all be instructed to look for a specific mail piece. A diverting path could be added to the sorters to divert the mail piece to a holding bin as soon as the planet code reader has identified the piece as passing by a reader. This method is not as fast as the one described above since there may be long delays between the time when the value added service was purchased and the time when the mail piece next passed a planet code reader.

V. Auto-Unloading Sorter that Stacks Flats and Letters Separately into Two Types of Trays The USPS has documented a desire to merge all mail streams together into a single mail stream, sort them all to delivery sequence, and bundle all mail pieces destined for any address together. This initiative, known as the Delivery Point Packaging (DPP) initiative would save the USPS about $3 B per year in manual sorting labor and by reducing the amount of time it takes mail carriers to sort about 60% of the mail manually, and then integrate multiple mail streams during deliveries. The USPS has spent about $5M in contracts with four postal automation suppliers trying to develop a system that will accomplish these objectives.

One problem overlooked by the USPS in the DPP initiative is the problem of stacking the integrated mail into trays, and transporting those trays to the various destinations within the postal sorting and delivery network prior to final delivery. Today, the USPS has two general types of trays for transporting mails: letter trays in which the letter sized mail is stood on edge, and flats trays ("tubs") in which the flats are laid down in the trays so that their faces are parallel with the bottom of the tray. Other posts, such as Royal Mail, use a single type of tray to accommodate both types of mail, but the same stacking arrangements apply: letters stacked on edge, flats lay flat. In all applications, the mail trays nest together for easy transport when they are empty, and they can be stacked one on top of another even when filled with mail.

To date, the postal infrastructures for moving filled mail trays are optimized for "packing density". If the filled trays stack neatly one on top of another, then the costs of trucking or flying the mail from one destination to another is reduced. It is costly to "ship air."

However, if flats and letters are intermixed, as the DPP initiative envisions, then this existing infrastructure for moving trays of mail around no longer applies. If the intermixed letters and flats are stacked on edge in trays like letter mail is currently stacked, then the flats will extend out the top of the trays. Thus, these types of trays can no longer be stacked one on top of the other without risking tipping over (which unsorts the mail.) Alternatively, if letter mail is laid into flats trays in the same orientation as flats are currently done, a significant portion of the tray capacity will be air, not mail. In either case, the costs of shipping will rise significantly, because the density of the trayed mail being shipped will be reduced. This will erode some of the savings from the DPP initiative.

This embodiment of the instant invention provides a solution involving the steps of completing the entire sorting operation with all of the types of mail in the mail stream fully integrated in random order, then separating the sorted mail into two streams of mail—letters and flats—just before the automated stacking operation. The letters are automatically stacked in letter trays, and the flats stacked in flats trays, as is currently the practice. Thus, the benefits of the DPP initiative are generally preserved, but the costs associated with "shipping air" are avoided. The packing density of the mail during shipment will not change compared to how the shipping operations are conducted today.

This embodiment of the instant invention provides a system and method for preserving the current packing density of mail stacked automatically in mail trays by a fully automated sorting system in which all mail streams have been integrated for the sorting operations. At the end of the sorting operation, the mail is transported by the sorter to an automated unloading area. The method consists of the steps of integrating all mail streams for sorting, separating the integrated mail stream into two batches (letter mail and flats mail), then automatically stacking letter mail on edge into mail trays designed for letter mail, and automatically stacking the flats mail with its face parallel to the bottom of trays designed for stacking flats mail.

This embodiment of the instant invention retains all the benefits of sorting an integrated mail stream, but retains the current cost of shipping trays of mail from one destination to another with the current packing density of mail in trays. Most of the benefits of the DPP initiative are preserved.

The aforementioned provisional applications disclose the use of mail clamps to clamp each mail piece. All of the sorting steps operate directly on the clamp, so the full range of mail piece types can be loaded into the sorter and sorted without risking mail piece jams or damage. One of the best aspects of this sorting system is the automated unload feature. For many competitive sorting systems, the unloading step is a manual operation. It has been estimated that providing an automated unload system could save the USPS about $2 Billion each year in labor costs for centralized sorting operations. The aforementioned provisional applications included means to transport the sorted mail to an unload station, which unclamped the individual mail pieces and loaded them into trays.

This embodiment of the instant invention refines the unloading and traying steps. First, the fully integrated mail stream is separated into two mail streams: flats and letters. In practice, the operator can select the definition of flats and letters. Since the dimensions of each mail piece are measured during the initial process of loading the mail pieces into clamps, and this information is retained and associated with the unique identifier on the clamp holding the mail piece, the operator can define a specific threshold for mail piece size to determine which of the two mail streams it will be separated into.

Figure 10:
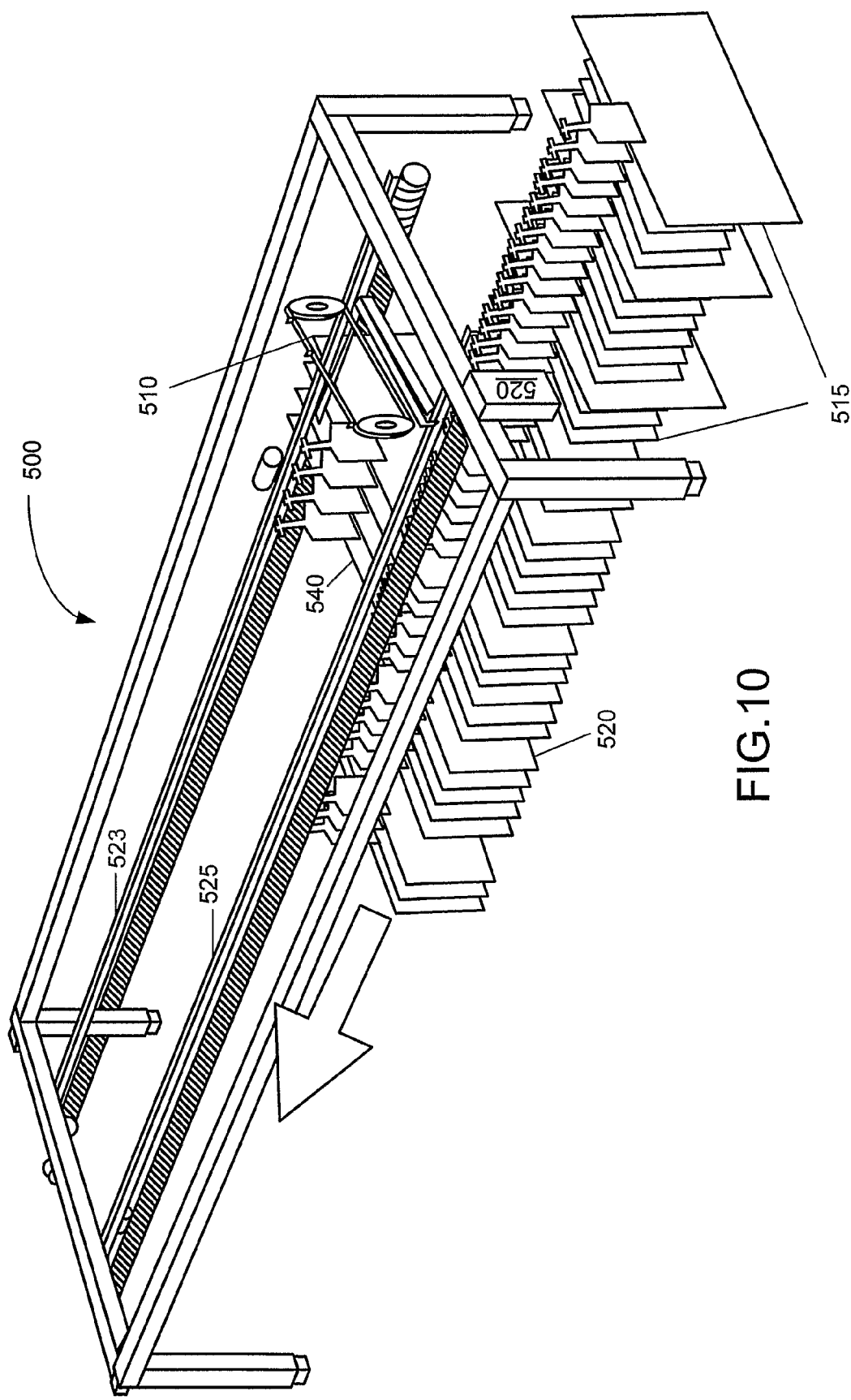
FIG. 10 is a schematic of a sorter module with a diverter path for separating letters from flats in accordance with an embodiment of the instant invention.

In operation, after the mail has been sorted, it is moved toward the unloading and traying station. Referring now to FIG. 10, a system for separating letters from flats before unloading is shown. A sorter module 500 has a diverter path 510 for separating letters from flats. Mail 515 that has been previously merged (flats and letters intermixed), moves into a separation module located after the sorting modules and before the unloading modules. As the stream of intermixed mail arrives at the separating module, the identifier on each clamp is read by reader 520. If the piece in the clamp is larger than a designated (operator selectable) threshold size (say 6"×9" in the US) it is determined to be a flat, and it is diverted into a second path 523 by the diverter 510. If the mail piece size is below the designated threshold, it is considered to be a letter, and it remains in the original path 525. Thus, letter-sized mail only 520, in delivery sequence, proceeds along path 525. Flats mail 540, in delivery sequence, proceeds along path 523.

Figure 11:
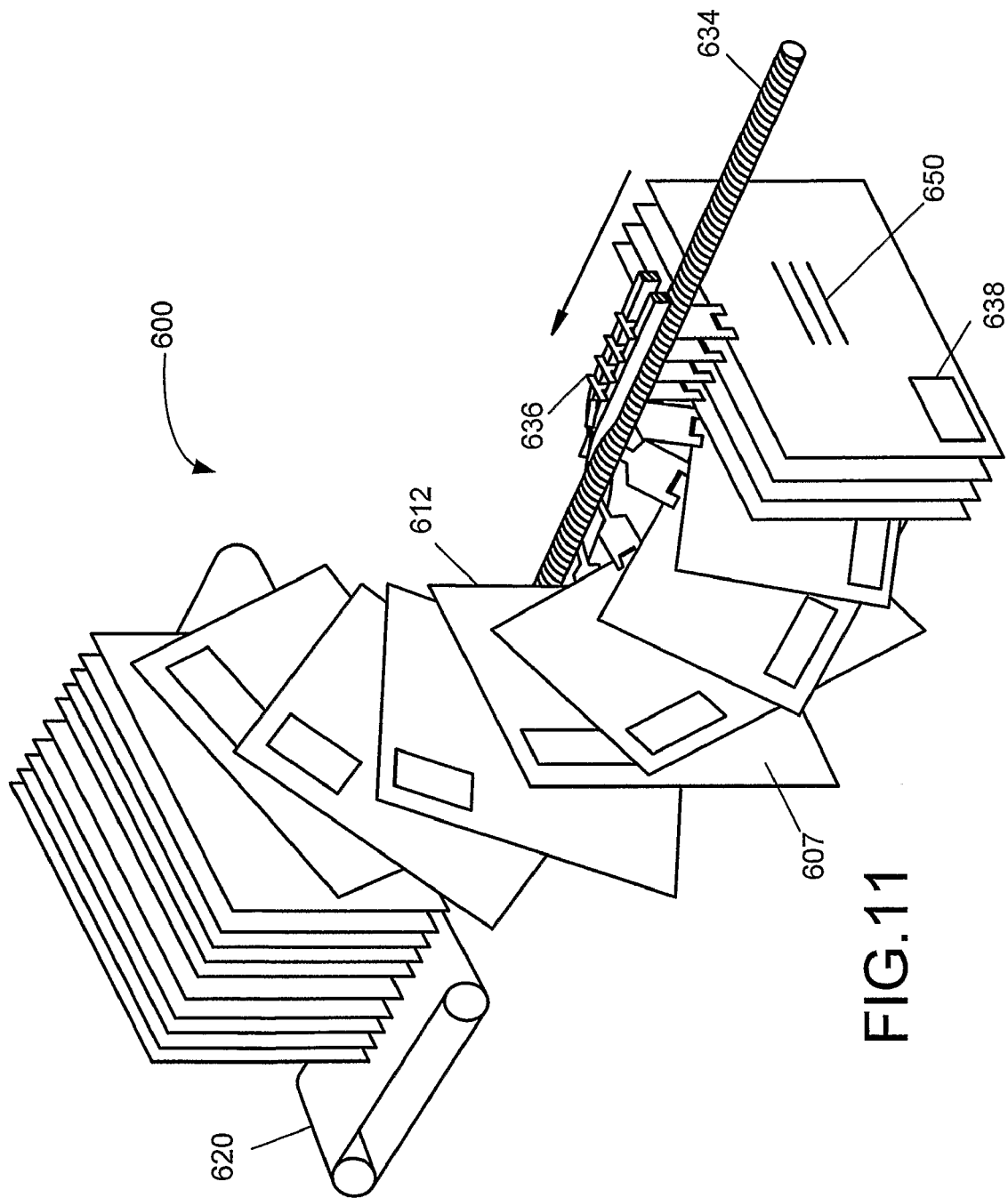
FIG. 11 is a schematic of an inversion module for inverting letters or flats that have been separated by the module of FIG. 10 in accordance an embodiment of with the instant invention.

Downstream of the separator module, two mail streams now exist. Each mail stream will have similar operations, but they will be designed to handle the different sizes of the mail stream and the mail trays. Referring now to FIG. 11, in each separated mail stream, the mail in the clamps is then rotated radially while it continues to move down the transport (driven by a lead screw). FIG. 11 shows an inversion module 600 for inverting the letters or flats that have been separated by the module of FIG. 10. This inverts the mail so that the addresses are re-oriented into right side up so a delivery person can easily read them after being loaded into the trays. The stream of mail is then advanced to two belts, one on each side of the line of clamps. The two belts support the stream of mail while the clamps are being removed from the mail. FIG. 11 shows how each mail piece 607 is placed on the belts 620. The lead screw 634 drives the clamps 636 from the sorting stations, with a typical mail piece including indicia 638 and address 650 upside down. Mail is rotated radially while continuing to move in the same axial direction. Then the mail is stacked with the bottom edge 612 down, so that the addresses are right side up and easily readable by a mail carrier.

Figure 12:
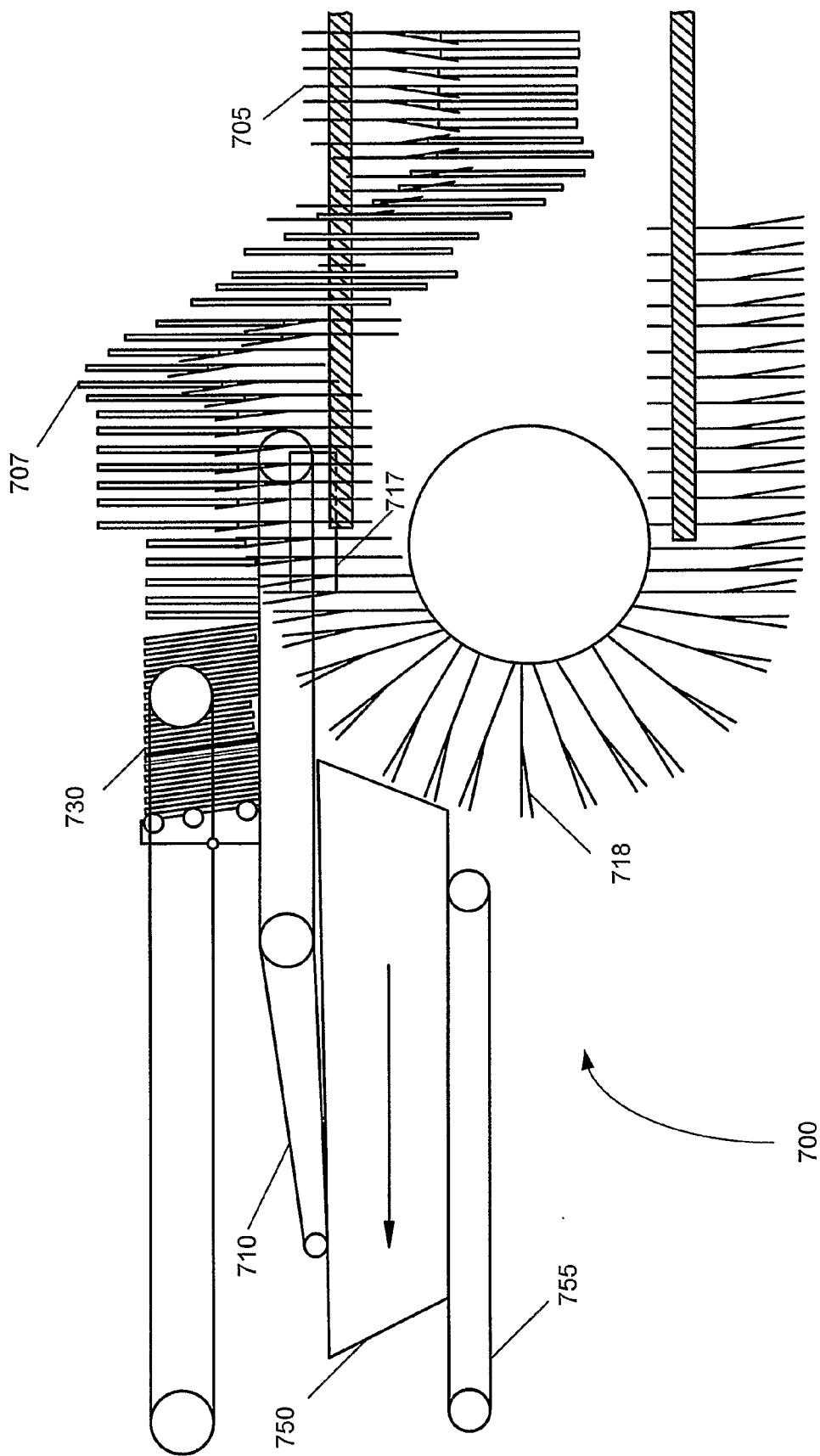
FIG. 12 is a schematic of a mail unloading module for unloading letters and flats in accordance an embodiment of with the instant invention.

Referring now to FIG. 12, a mail unloading module 700 is shown for unloading letters. Sorted mail 705 arrives from upstream, and inverted mail 707 is placed on belts 710 which could be the same as belts 620 in FIG. 11. Once the mail is on the support transport belts 710, the jaws of the clamps are opened by a clamp opening mechanism 717, and the clamps 718 are moved downward below the top surface of the belts, leaving the stacked mail pieces 730 on top of the belt(s). The stacked mail pieces 730 are then fed into trays 750 which are moved along a letter tray transport belt 755.

The controller will use information about mail piece thickness (scanned at the entry to the separation module and associated with the clamp identifier) to calculate the number of mail pieces to unload on top of the belt. The size of the mail tray will be known (for example, a standard letter tray in the USPS is 24" long.) The controller will add together the recorded thickness of all the mail pieces in the sorted stream until a total just a little less total thickness than the mail tray size is accumulated. For example, if the tray can hold 24" of mail, mail pieces will continue to be rotated and removed from the clamps until a total cumulative thickness of 22" is reached.

The belts will then advance the accumulated 22" of mail into a tray loading system. For the sake of this application, we assume the mail will be cascaded off the belts and into a tray, which will be transported in the direction of the mail at a speed compatible with the fill rate.

Figure 13:
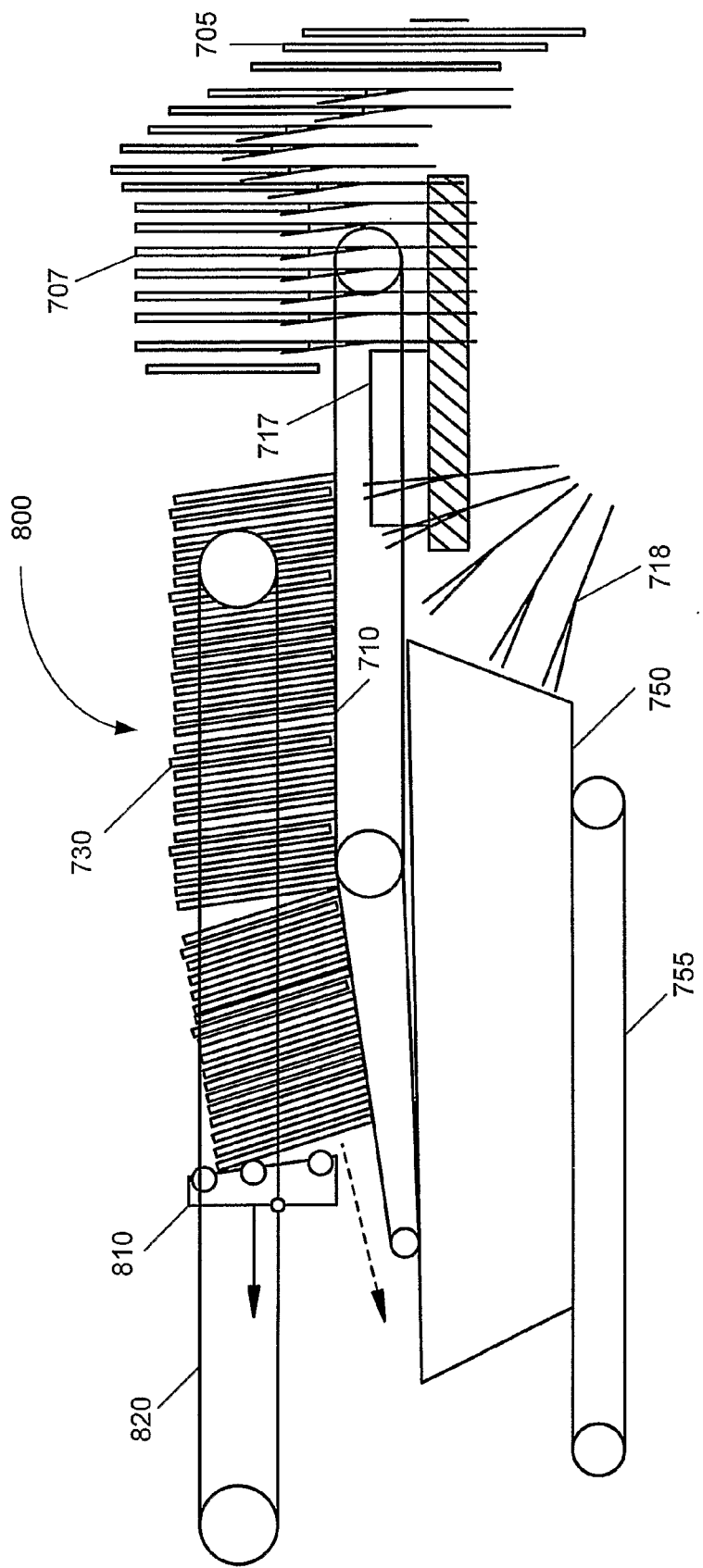
FIG. 13 is a schematic of a mail unloading module for unloading a full tray of mail in accordance an embodiment of with the instant invention.

Referring now to FIG. 13, the clamped, sorted, and separated (into a stream of letters) mail is shown being transported to the unload belt. FIG. 8 shows a mail unloading module 800 for unloading a full tray of mail. The mail is inverted axially as shown in FIG. 11, and then moved a short distance over the top of two transport belts 710 spaced far enough apart to allow the clamp to move between them. A clamp opening mechanism 717 then opens the clamps and moves the clamps 718 downwardly to free the mail pieces 730 and stack them on end, leaning against a backstop 810. The backstop is on a second transport 820, configured to move with the two belts 710 that are now supporting the mail. These three transport belts move at a speed consistent with the fill rate of the mail.

When a stack of mail with the accumulative thickness of just under the length of the tray has been accumulated, the upstream clamped mail transport and axial rotation mechanism temporarily halts operation. As shown in FIG. 12, a mail tray has been placed under the two transport belts. When the equivalent of a tray full of mail has been accumulated on top of the two transport belts, that row of accumulated mail is advanced to the end of the belts. This is shown in FIG. 13.

Figure 14:
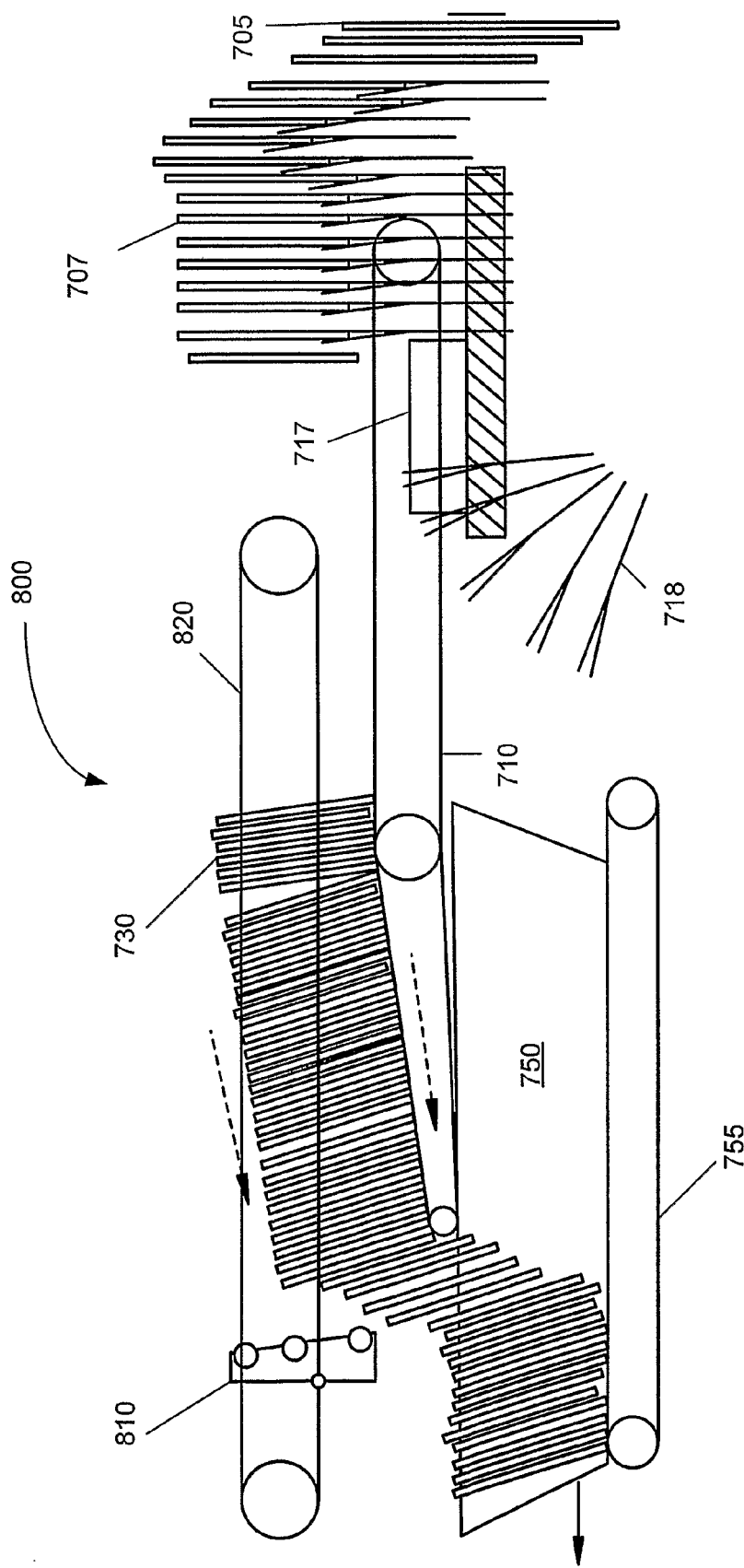
FIG. 14 is a schematic of a mail unloading module of FIG. 13 showing the mail being cascaded into the mail tray.

Next, the tray full of mail on the belts is moved to the end of the two transport belts, where it is cascaded into the mail tray. As shown in FIG. 14, once the mail begins to cascade off the end of the two belts, the belts and the transport advance at the same (fill) rate, allowing all of the accumulated mail to be stacked into the tray. FIG. 14 shows the mail unloading module of FIG. 13 with the mail being cascaded into the mail tray. In FIG. 14, the backstop 810 is shown positioned just off the end of the mail transport belts 710. In this position, it functions as a guide, and enables the mail to cascade into the tray 750 while insuring that the mail 730 remains in its tipped upright orientation as it cascades into the tray.

When all the mail in the accumulated batch is advanced off the end of the (two) belts and into the tray, the tray filled with mail is transported to the left, and a new tray is put in place. (This could be a manual or an automated operation. Details not shown.) The backstop transport then moves the backstop back to its home position. The upstream operations of advancing clamped mail, rotating it, unclamping it, and placing it on the two belts is then resumed to accumulate the next tray full of mail on top of the two belts.

Unloading Flats Mail into Trays:

Letter mail is typically stacked in trays standing on end, as shown in FIGS. 10-14. Flats mail, on the other hand, is typically stacked in trays lying with the faces of the mail parallel with the bottom of the tray. In some posts, such as the USPS, the flats trays are a different shape and size compared to the letters trays. In other posts, such as Royal Mail, the same tray is used for letters and flats. Regardless of whether the letter trays and flats trays are the same or different sizes, letters are generally stacked with the face of the mail parallel with the side of the tray, and flats are stacked with the faces of the mail parallel with the bottom of the tray.

So the flats stacking operation will be a little different than shown above for letters. The upstream operations remain the same as for letters: transporting clamped flats to the unload area, rotating the clamped flats axially to enable the address to be read right-side-up, and moving the bottom edge of the clamped flats over two belts separated far enough apart to enable the clamps to move between the belts, and finally, unclamping the flats to allow their bottom edges to rest on the two belts while the clamps are moved downwardly between the two belts. As with letters, the controller calculates the cumulative thickness of the flats to determine how many pieces must be stacked to fill a flats tray. The unclamped flats accumulate, standing on edge, on the two accumulator belts.

When a tray's worth of flats has been accumulated, the upstream operations stop. In order to stack the flats oriented so that their faces are parallel with the bottom of the tray, the tray 11 is oriented at a steeper angle than the letter trays. These last steps are shown in FIGS. 15 and 16.

Figure 15:
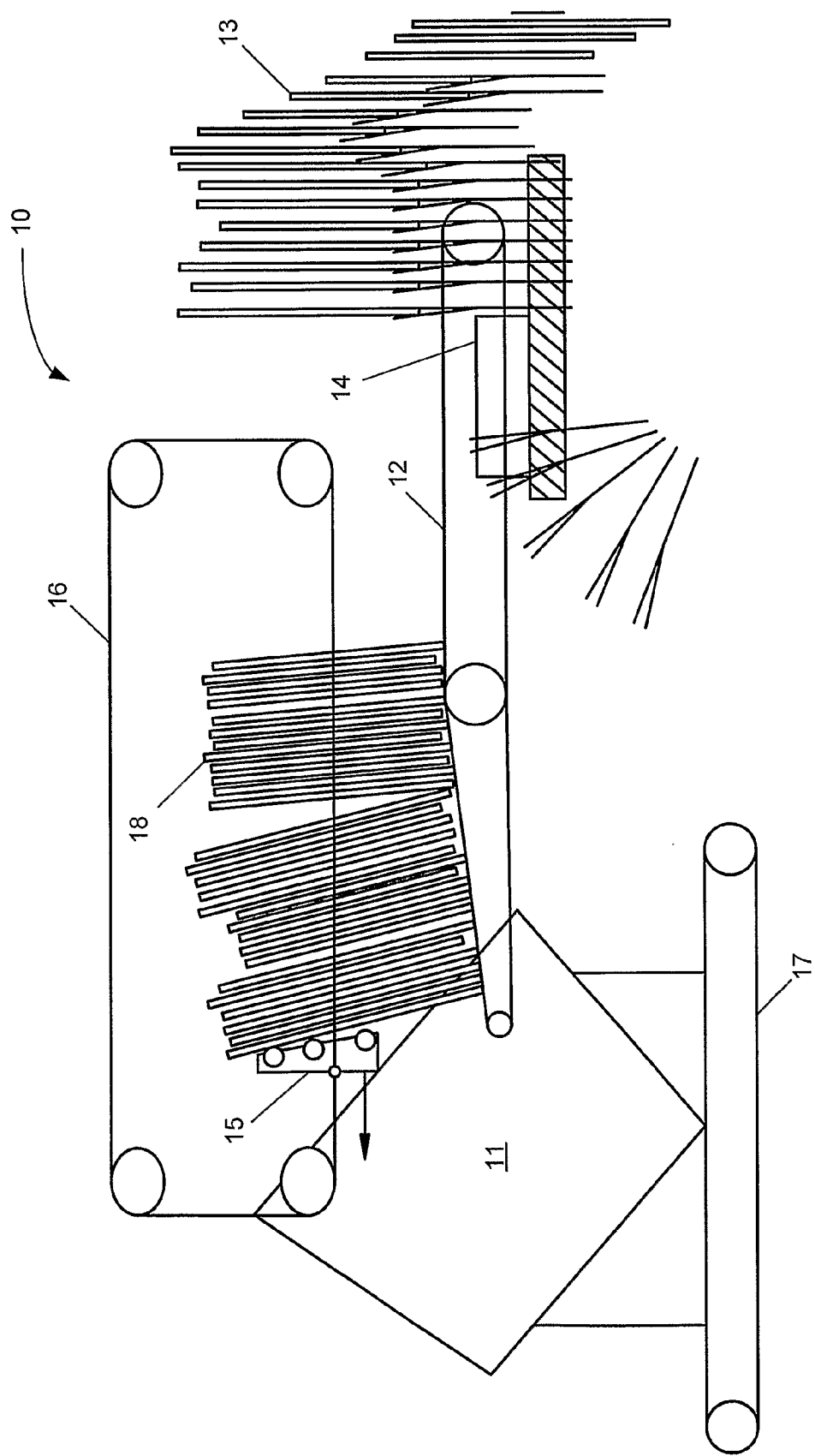
FIG. 15 is a schematic of a mail unloading module for unloading a full tray of flats in accordance an embodiment of with the instant invention.
Figure 16:
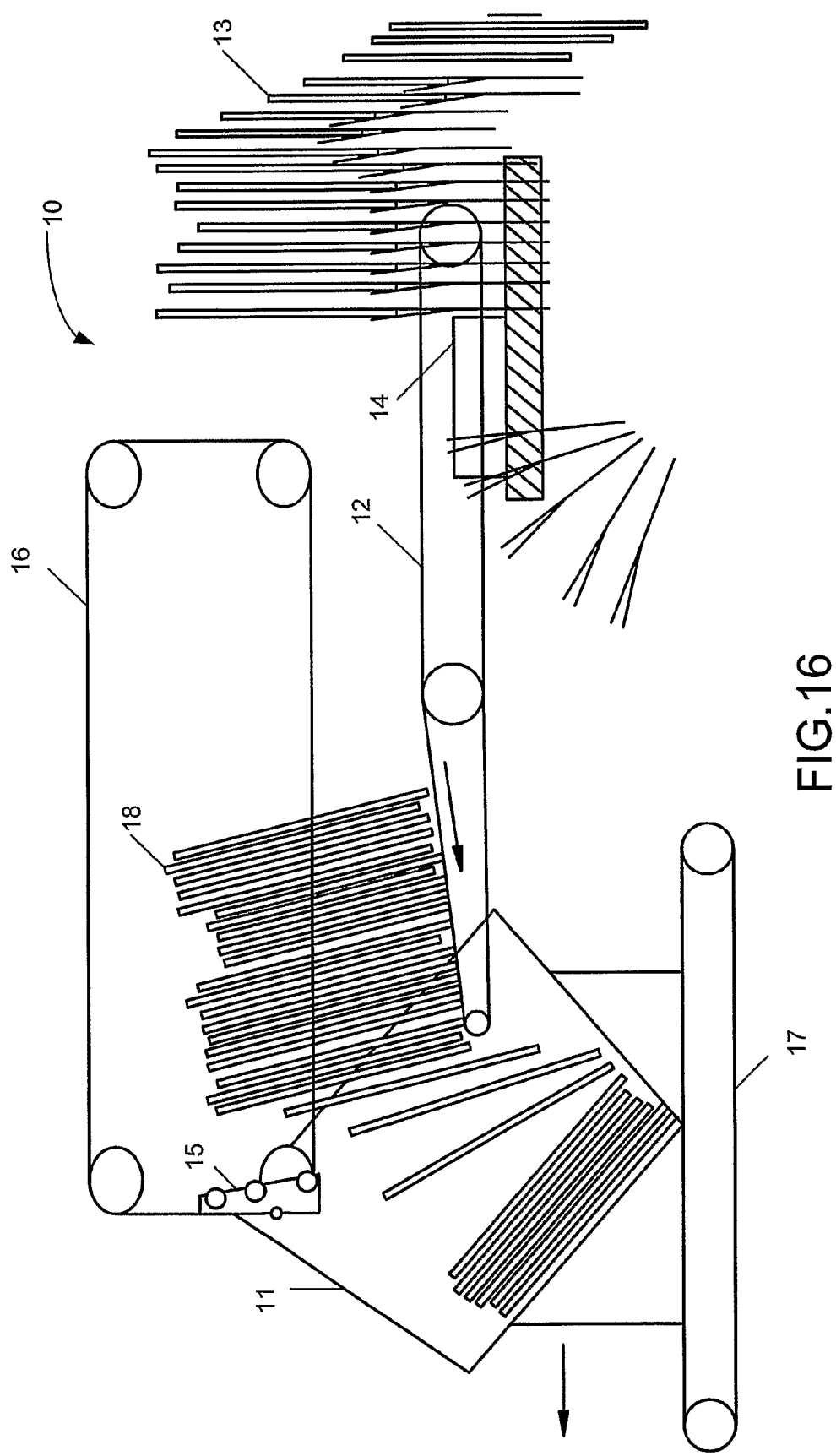
FIG. 16 is a schematic of a mail unloading module of FIG. 15 showing the flats being cascaded into the flats tray.

FIG. 15 shows a mail unloading module 10 for unloading a full tray of flats 18. Axial rotation 13 and unclamping 14 operations are halted when a tray's worth of flats has been accumulated and stacked on the two transport belts 12. The backstop 15 is moved by belt 16, and the tray 11 (when full) is moved by belt 17.

Next, the tray full of mail on the belts is moved to the end of the two transport belts, where it is cascaded into the mail tray. FIG. 16 shows the mail unloading module 10 of FIG. 15, with the flats being cascaded into the flats tray. As shown in FIG. 16, once the mail begins to cascade off the end of the two belts 12, the belts 12 and 16 advance at the fill rate, allowing all of the accumulated mail to be stacked into the tray.

The principal is the same between letter mail stacking and flats stacking, but the details vary. The flats trays are oriented at a different angle to enable the flats to lay down in the tray. But the tray is transported to the left at a speed consistent with the fill rate.

Key aspects of this embodiment of the present invention include the following:

1. The method of loading an integrated stream mail into clamps, measuring the dimensions of each mail piece, associating those dimensions with a unique identifier on the clamp holding the mail piece, sorting the integrated mail stream into multiple (usually two) mail streams based on a specified size threshold related to mail piece size, then automatically unloading mail pieces from the clamps, accumulating sufficient mail to fill a tray, and stacking the mail into a tray. Two stacking operations are included, one which stacks mail in trays standing on edge, and the other stacks the mail laying flat.
2. A method of determining how many mail pieces will be stacked in each tray based on previously measured thickness information for each mail piece. The mail pieces are unloaded from the clamps and accumulated on an interim accumulation station. The controller calculates the cumulative thickness of the stack of mailpieces in the interim accumulation station. When a predetermined cumulative thickness is achieved, the accumulated stack is moved toward a mail tray and stacked therein.
3. A clamp unloading and mail accumulation station consisting of a pair of belts separated by a distance sufficiently wide for clamps to move between the mail. A clamp opening mechanism releases the mail piece from the jaws of the clamp, and the clamp is moved below the surface of the belt, leaving the mail piece behind resting on edge on the surface of the two belts. The belts move an accumulated stack of mail at a speed consistent with the fill rate. When a tray's worth of mail has been accumulated, the two belts move to advance the mail to the end of the belt where it cascades into a tray located below the belt.

Mail is unloaded from letter sorters by hand today. For some flats sorters, the sorting bins are flats trays, and the mail is deposited directly into the trays. The trays can be automatically transported to a dispatching area. This works well only when the mail is being sorted to zip. It generally cannot be used to sort flats mail to delivery sequence since the volume of mail per destination is generally much less than a tray full.

It is to be understood that all of the present figures, and the accompanying narrative discussions of preferred embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. A mail sorter for sorting inbound mail pieces and outbound mail pieces, the sorter comprising:
   a plurality of sorter modules that are arranged in cooperative engagement with each other, and are configured to receive mail pieces that are a mixture of both inbound mail pieces and outbound mail pieces, and configured to sort both the inbound mail pieces and the outbound mail pieces; and
   at least one unsorted mail piece path utilized by both the inbound mail pieces and the outbound mail pieces,
   wherein the outbound mail pieces are mail pieces destined for sorting at a remote postal facility prior to delivery to destination addresses, and wherein the inbound mail pieces are other mail pieces.

2. The mail sorter of claim 1, further including a controller configured for sorting the inbound mail pieces while at least partly simultaneously sorting the outbound mail pieces.

3. The mail sorter of claim 1, wherein the inbound mail pieces are sorted to destination address and the outbound mail pieces are sorted to a less granular sort order.

4. The mail sorter of claim 1, wherein the plurality of sorter modules includes at least one sort-to-route module for sorting the inbound mail pieces according to delivery route, and at least one sort-to-tray module for sorting the outbound mail pieces according to outbound destination.

5. The mail sorter of claim 4, wherein the unsorted mail piece path of at least one sort-to-route module is connected to the unsorted mail piece path of at least one sort-to-tray module.

6. The mail sorter of claim 4, wherein each of the at least one sort-to-tray module comprises diverters for diverting mail pieces to a storage area, and from the storage area.

7. The mail sorter of claim 6, wherein:
the sort-to-tray module has a sorted mail piece path and an unsorted mail piece path,
the storage area is substantially located between the sorted mail piece path and the unsorted mail piece path, and
the diverters divert the mail pieces from the unsorted mail piece path to the storage area, and from the storage area to the sorted mail piece path.

8. The mail sorter of claim 4, wherein the storage area can accommodate at least a number of mail pieces sufficient to fill a mail tray.

9. The mail sorter of claim 4, wherein the sort-to-route module has a sorted mail piece path and an unsorted mail piece path, and at least one diverter for diverting inbound mail pieces from the unsorted mail piece path to the sorted mail piece path.

10. The mail sorter of claim 9, wherein the sorted mail piece path is configured to store sorted mail pieces and is also configured to, at other times, transport sorted mail pieces.

11. The mail sorter of claim 4, wherein the plurality of sorter modules further includes at least one sort-to-delivery-sequence module for sorting the inbound mail pieces according to delivery location along the delivery route.

12. The mail sorter of claim 11, wherein the sorted mail piece path of at least one sort-to-route module is connected to the unsorted mail piece path of at least one sort-to-delivery sequence module.

13. The mail sorter of claim 11, wherein the sort-to-delivery-sequence module has a sorted mail piece path, an unsorted mail piece path, and a plurality of diverters for selectively diverting inbound mail pieces from the unsorted mail piece path to the sorted mail piece path.

14. The mail sorter of claim 13, wherein the sorted mail piece path of the sort-to-route module is connected to the unsorted mail piece path of the sort-to-delivery sequence module.

15. A method for sorting inbound mail pieces and outbound mail pieces, the method comprising:
arranging a plurality of sorter modules in cooperative engagement with each other;
receiving mail that is a mixture of both inbound mail pieces and outbound mail pieces;
utilizing at least one unsorted mail piece path by both the inbound mail pieces and the outbound mail pieces;
sorting both the inbound mail pieces and the outbound mail pieces using the plurality of sorter modules; and
wherein the outbound mail pieces are mail pieces destined for sorting at a remote postal facility prior to delivery to destination addresses, and wherein the inbound mail pieces are other mail pieces.

16. The method of claim 15, wherein sorting of the inbound mail pieces is at least partly simultaneous with sorting of the outbound mail pieces.

17. The method of claim 16, wherein the sorted mail piece path is of sufficient length to store all the mail to be delivered to a route.

18. The method of claim 15, wherein the inbound mail pieces are sorted to destination address and the outbound mail pieces are sorted to a less granular sort order.

19. The method of claim 15, wherein the plurality of sorter modules includes at least one sort-to-route module for sorting the inbound mail pieces according to delivery route, and at least one sort-to-tray module for sorting the outbound mail pieces according to outbound destination.

20. The method of claim 19, wherein each of the at least one sort-to-tray module comprises diverters for diverting mail pieces to a storage area, and from the storage area.

21. The method of claim 20, wherein:
the sort-to-tray module has a sorted mail piece path and an unsorted mail piece path,
the storage area is substantially located between the sorted mail piece path and the unsorted mail piece path, and
the diverters are for diverting the mail pieces from the unsorted mail piece path to the storage area, and from the storage area to the sorted mail piece path.

22. The method of claim 19, wherein the plurality of sorter modules further includes at least one sort-to-delivery-sequence module for sorting the inbound mail pieces according to delivery location along the delivery route.

23. The method of claim 22, wherein the sort-to-delivery-sequence module has a sorted mail piece path, an unsorted mail piece path, and at least one diverter for selectively diverting inbound mail pieces from the unsorted mail piece path to the sorted mail piece path.

24. The method of claim 19, wherein the sort-to-route module has a sorted mail piece path and an unsorted mail piece path, and at least one diverter for selectively diverting inbound mail pieces from the unsorted mail piece path to the sorted mail piece path.

25. The method of claim 19, wherein the sorted mail piece path of the at least one sort-to-route module connects to the unsorted mail piece path of the at least one sort-to-delivery-sequence module.

26. A method comprising:
loading various size mail pieces into clamps;
sorting the mail pieces into a desired order;
further sorting the mail pieces into at least two mail streams based upon whether the size of each mail piece is above or below a specified size; and
unloading and stacking the mail pieces using at least two different stacking methods for the at least two of the mail streams.

27. The method of claim 26, wherein one of the at least two different stacking methods stacks the mail pieces on edge in at least one mail tray, and wherein another of the at least two different stacking methods stacks the mail pieces laying flat.

28. The method of claim 26, further comprising determining how many mail pieces will be stacked in a tray based at least partly upon a pre-stacking measurement of thickness of mail pieces.

* * * * *